US012452606B2

(12) United States Patent
Tong et al.

(10) Patent No.: US 12,452,606 B2
(45) Date of Patent: Oct. 21, 2025

(54) SPEAKER STRUCTURE AND SPEAKER DEVICE

(71) Applicant: ShenZhen Luxshare Acoustics Technology Ltd., Shenzhen (CN)

(72) Inventors: Zhihua Tong, Shenzhen (CN); Zhihe Zeng, Shenzhen (CN)

(73) Assignee: SHENZHEN LUXSHARE ACOUSTICS TECHNOLOGY LTD., Shenzhen (CN)

( * ) Notice: Subject to any disclaimer, the term of this patent is extended or adjusted under 35 U.S.C. 154(b) by 207 days.

(21) Appl. No.: 18/221,180

(22) Filed: Jul. 12, 2023

(65) Prior Publication Data

US 2024/0022863 A1 Jan. 18, 2024

(30) Foreign Application Priority Data

Jul. 13, 2022 (CN) ......................... 202210820494.2
Apr. 28, 2023 (CN) ......................... 202310483718.X

(51) Int. Cl.
*H04R 9/06* (2006.01)
*H04R 1/28* (2006.01)
(Continued)

(52) U.S. Cl.
CPC ............. *H04R 9/06* (2013.01); *H04R 1/2896* (2013.01); *H04R 7/18* (2013.01); *H04R 7/20* (2013.01);
(Continued)

(58) Field of Classification Search
CPC ........ H04R 1/2896; H04R 7/045; H04R 7/18; H04R 7/20; H04R 9/025; H04R 9/043;
(Continued)

(56) References Cited

U.S. PATENT DOCUMENTS 11,832,075 B2 * 11/2023 Lv ........................ H04R 1/2896
12,143,796 B2 * 11/2024 Tong ...................... H04R 9/045
12,200,462 B2 * 1/2025 Tong ...................... H04R 9/025

FOREIGN PATENT DOCUMENTS

CN 111405438 A 7/2020
CN 114257895 A 3/2022
(Continued)

*Primary Examiner* — Huyen D Le
(74) *Attorney, Agent, or Firm* — Birch, Stewart, Kolasch & Birch, LLP

(57) ABSTRACT

The speaker structure of the first embodiment has a magnetic carrier plate and two magnetic modules. The two magnetic modules are arranged on the magnetic carrier and the two voice coils correspond to the two magnetic modules, so that the vibration sound structure increases the sound variability. The supporting elastic member and the two auxiliary elastic members are respectively connected between the outer frame and the two voice coils, so as to stabilize the vibration of the two voice coils. The speaker structure of the second embodiment uses the first and second extensions of the outer frame to limit the range in which the magnetic carrier can vibrate upward when the magnetic carrier vibrates upward. The speaker device assembles the speaker structure with a case, and the case can limit the downward vibration range of the magnetic carrier of the speaker structure.

36 Claims, 15 Drawing Sheets

(51) Int. Cl.
*H04R 7/18* (2006.01)
*H04R 7/20* (2006.01)
*H04R 9/02* (2006.01)
*H04R 9/04* (2006.01)
*H04R 7/04* (2006.01)

(52) U.S. Cl.
CPC ............. *H04R 9/025* (2013.01); *H04R 9/043* (2013.01); *H04R 9/045* (2013.01); *H04R 9/046* (2013.01); *H04R 9/063* (2013.01); *H04R 7/045* (2013.01); *H04R 2400/11* (2013.01); *H04R 2499/11* (2013.01)

(58) Field of Classification Search
CPC .......... H04R 9/045; H04R 9/046; H04R 9/06; H04R 9/063; H04R 2400/11; H04R 2499/11
See application file for complete search history.

(56) References Cited

FOREIGN PATENT DOCUMENTS

| | | | |
|---|---|---|---|
| CN | 114554369 | A | 5/2022 |
| CN | 115002620 | A | 9/2022 |
| CN | 115103275 | A | 9/2022 |
| TW | M615549 | U | 8/2021 |
| TW | M638347 | U | 3/2023 |

* cited by examiner

SPEAKER STRUCTURE AND SPEAKER DEVICE

CROSS REFERENCE TO RELATED APPLICATION

This application claims the priority benefits of Chinese Patent Application Serial Number 202210820494.2, filed on Jul. 13, 2022, and another Chinese Patent Application Serial Number 202310483718.X, filed on Apr. 28, 2023, the full disclosure of which is incorporated herein by reference.

BACKGROUND

Technical Field

The present invention is in related to a technical field of a speaker structure, more particularly to a speaker structure and a speaker device.

Related Art

In the prior art, with the improvement of the quality of life and the popularization of smart mobile devices, people are constantly pursuing the sound quality of the playback sound quality of the speakers that can be carried around. Present speakers are mainly composed of magnets, coils and diaphragms and convert the vibrations of the current frequencies into sounds. Regarding how to further improve the performance of the speaker for playing music, one of the difficult problems to be solved is the problem of internal vibration structure.

SUMMARY

The present invention is to provide a speaker device, which solves the problem that the current vibrations, while the speaker device is at work, are transmitted to the terminal, thereby causing resonance of other components in the device, so as to result poor music quality.

To figure out the aforesaid problem, the present invention is discussed as following.

The first aspect provides a speaker structure, comprising: a magnetic element, having a magnetic carrier and a magnetic module, the magnetic carrier having two first lateral walls, two second lateral walls, and a bottom plate, the two first lateral walls and the two second lateral walls being disposed at two sides of the bottom plate, the magnetic module comprising a first magnetic module and a second magnetic module, the first magnetic module and the second magnetic module being disposed on the bottom plate, the first magnetic module being disposed between the two first lateral walls, the second magnetic module being disposed between the two second lateral walls; an outer frame, comprising a frame member and a supporting rib, the outer frame disposed at a peripheral side of the magnetic element; the two ends of the supporting rib respectively connected and fixed to two internal walls of the frame member, the supporting rib being disposed between the first magnetic module and the second magnetic module; two elastic members, each connected with the magnetic carrier and the outer frame, the elastic member being respectively disposed at two ends of the magnetic carrier, the magnetic element being connected into the outer frame in a suspended manner through the two elastic members; a vibration member, disposed on the outer frame and located at the magnetic element and the two elastic members; a voice coil, comprising a first voice coil and a second voice coil, the first voice coil and the second voice coil being arranged underneath the vibration member, the first voice coil located among the first magnetic module and the two first lateral walls of the magnetic carrier, the second voice coil located among the second magnetic module and the two second lateral walls of the magnetic carrier, a supporting elastic member, fixed to the supporting rib, the two ends of the supporting elastic member being respectively connected to one end of the first voice coil and one end of the second voice coil; and two auxiliary elastic members, respectively connected between the other end of the first voice coil and the outer frame and between the other end of the second voice coil and the outer frame.

In one embodiment, the auxiliary elastic member has a fixing portion and a connecting portion, two sides of the fixing portion being elongated to connect with two sides of the connecting portion, the fixing portion being disposed in the outer frame, and the connecting portion being disposed at a bottom portion of the voice coil.

In one embodiment, each of the auxiliary elastic members comprises a fixing portion and a connecting portion, wherein two sides of the fixing portion are elongated to connect with two sides of the connecting portion, the fixing portion is disposed in the outer frame, and the connecting portion is disposed at a bottom portion of the voice coil.

In one embodiment, the supporting elastic member has two fixing sections, a first connecting section and a second connecting section, the two fixing sections being firmly disposed at the two ends of the supporting rib, one side of each of the two fixing sections being elongated to connect with the first connecting section, the first connecting section being connected with the one end of the first voice coil, another side of each of the two fixing sections being elongated to connect with the second connecting section, the second connecting section being connected with the one end of the second voice coil.

In one embodiment, each of the two first lateral walls has a first lateral magnetic member and a first lateral magnetic plate, the two first lateral magnetic members being disposed at the two sides of the bottom plate, the two first lateral magnetic plates being disposed at the two first lateral magnetic members, each of the two second lateral walls having a second lateral magnetic member and a second lateral magnetic plate, the two second lateral magnetic members being disposed at the two sides of the bottom plate, the two second lateral magnetic plates being disposed at the two second lateral magnetic members, the first magnetic module further having a first magnetic member and a first magnetic plate, the first magnetic member being disposed on the bottom plate, the first magnetic plate being disposed on the first magnetic member, the second magnetic module further having a second magnetic member and a second magnetic plate, the second magnetic member being disposed on the bottom plate, the second magnetic plate being disposed on the second magnetic member.

In one embodiment, each of the elastic members comprises a fixing bracket and two connecting brackets, the fixing bracket being disposed at the outer frame, the two connecting brackets being respectively elongated from two sides of the fixing bracket, and fixed at two bottom portions of two ends of the two lateral walls and the two sides of the magnetic carrier.

In one embodiment, an external side of the two connecting brackets of each of the two elastic members is elongated outwardly to be beneath the outer frame, a vertical vibration path of the elastic member and a vertical vibration path of the connecting bracket being limited by the outer frame.

In one embodiment, the outer frame has a frame member and a first extension portion, the first extension portion extending inwardly from the frame member adjacent to the inner sides of the two lateral walls of the magnetic carrier, the first extension portion being above the two first lateral walls and the two second lateral walls.

In one embodiment, the outer frame has a frame member and a second extension portion, the second extension portion extending inwardly from the inner sides of the two first lateral walls and the two second lateral walls adjacent to the frame member without the magnetic carrier, the first extension portion being above the bottom plate of the magnetic carrier.

In one embodiment, the outer frame has a frame member and a supporting frame, the supporting frame being in the frame member, in order to assist in supporting the structure of the frame member.

In one embodiment, the bottom plate has four notches, which are respectively disposed at four corners of the bottom plate, the four ends of the two lateral walls being respectively elongated to four positions where are above the four notches, the two connecting brackets of the two elastic members being respectively and firmly disposed at the two bottom portions of the two ends of the two lateral walls.

In one embodiment, the bottom plate has four accommodation notches, which are respectively disposed at four corners of the bottom plate, the four ends of the two lateral walls being elongated to four positions where are above the four accommodation notches, the two connecting brackets of the two elastic members being embedded into the four accommodation notches and disposed at the two bottom portions of the two ends of the two lateral walls.

In one embodiment, each of the two elastic members further has two connecting arms, one end of the connecting arm being connected with the fixing bracket, and another end of the connecting arm being connected with the connecting bracket.

In one embodiment, the connecting arm is a curved structure, and a side, adjacent to the bottom plate, of the connecting bracket has an avoidance gap.

In one embodiment, the outer frame has two fixing portions, which are respectively disposed at a bottom portion of the outer frame with the two elastic members, the fixing portion having a fixing slot, the fixing bracket of the elastic member being firmly disposed in the fixing slot.

In one embodiment, the speaker structure further comprises a damper, which is disposed between a bottom portion of the fixing slot of the outer frame and the fixing bracket of the elastic member.

A second aspect provides a speaker structure, comprising: a magnetic element, having a magnetic carrier and a magnetic module, the magnetic carrier having two lateral walls and one bottom plate, the two lateral walls being disposed at two sides of the bottom plate, the magnetic module being disposed on the bottom plate; an outer frame, comprising a frame member, a first extension position and a second extension position, the outer frame disposed at a peripheral side of the magnetic element, the first extension portion extending inwardly from the frame member adjacent to the inner sides of the two lateral walls of the magnetic carrier, the first extension portion being above the two first lateral walls and the two second lateral walls, the second extension portion extending inwardly from the inner sides of the two first lateral walls and the two second lateral walls adjacent to the frame member without the magnetic carrier, the first extension portion being above the bottom plate of the magnetic carrier; two elastic members, each connected with the magnetic carrier and the outer frame, the elastic member being respectively disposed at two ends of the magnetic carrier, the magnetic element being connected into the outer frame in a suspended manner through the two elastic members; a vibration member, disposed on the outer frame and located at the magnetic element and the two elastic members; and a voice coil, disposed underneath the vibration member and located among the magnetic module and the two lateral walls of the magnetic carrier.

In one embodiment, each of the elastic members comprises a fixing bracket and two connecting brackets, wherein the fixing bracket is disposed at the outer frame, and the two connecting brackets are respectively elongated from two sides of the fixing bracket, and fixed at two bottom portions of two ends of the two lateral walls and the two sides of the magnetic carrier.

In one embodiment, an external side of the two connecting brackets of each of the two elastic members is elongated outwardly to be beneath the outer frame, a vertical vibration path of the elastic member and a vertical vibration path of the connecting bracket being limited by the outer frame.

In one embodiment, the outer frame has a frame member and a supporting frame, the supporting frame being in the frame member, in order to assist in supporting the structure of the frame member.

In one embodiment, the bottom plate has four notches, which are respectively disposed at four corners of the bottom plate, the four ends of the two lateral walls being respectively elongated to four positions where are above the four notches, the two connecting brackets of the two elastic members being respectively and firmly disposed at the two bottom portions of the two ends of the two lateral walls.

In one embodiment, the bottom plate has four accommodation notches, which are respectively disposed at four corners of the bottom plate, the four ends of the two lateral walls being elongated to four positions where are above the four accommodation notches, the two connecting brackets of the two elastic members being embedded into the four accommodation notches and disposed at the two bottom portions of the two ends of the two lateral walls.

In one embodiment, the speaker structure further comprising two auxiliary elastic members, the two auxiliary elastic members being connected with the voice coil and the outer frame, and corresponding to two ends of the voice coil, wherein the two ends are not adjacent to the two lateral walls of the magnetic carrier.

In one embodiment, the auxiliary elastic member has a fixing portion and a connecting portion, two sides of the fixing portion being elongated to connect with two sides of the connecting portion, the fixing portion being disposed in the outer frame, and the connecting portion being disposed at a bottom portion of the voice coil.

In one embodiment, each of the two lateral walls has a lateral magnetic member and a lateral magnetic plate, the lateral magnetic member being disposed at the one side of the bottom plate, the lateral magnetic plate being disposed at the lateral magnetic member, the magnetic module further having a magnetic body and a magnetic plate, the magnetic body being disposed on the bottom plate, the magnetic plate being disposed on the magnetic body.

In one embodiment, the two lateral walls of the magnetic carrier comprises two first lateral walls and two second lateral walls; the magnetic module further has a first magnetic module and a second magnetic module, the first magnetic module and the second magnetic module being disposed on the bottom plate of the magnetic carrier in order, the two first lateral walls and the two second lateral wall being on two sides of the bottom plate, the two first lateral walls being disposed at the two sides of the first magnetic module, and the two second lateral walls being disposed at the two sides of the second magnetic module.

In one embodiment, the voice coil has a first voice coil and a second voice coil, which are disposed beneath the vibration member, the first voice coil being between the first magnetic module and the two first lateral walls of the magnetic carrier, and the second voice coil being between the second magnetic module and the two second lateral walls of the magnetic carrier.

In one embodiment, the outer frame further has a frame member and a supporting rib, two ends of the supporting rib being connected with two inner walls of the frame member respectively, the supporting rib being disposed between the first voice coil and the second voice coil.

In one embodiment, the speaker structure further comprises a supporting elastic member and two auxiliary elastic members, the supporting elastic member being firmly disposed at the supporting rib, two sides of the supporting elastic member being connected with one end of the first voice coil and one end of the second voice coil, one end of one of the auxiliary elastic members being connected with the other end of the first voice coil, wherein the other end of the first voice coil is neighbor to the outer frame, one end of another of the auxiliary elastic members being connected with the other end of the second voice coil, wherein the other end of the second voice coil is adjacent to the outer frame.

In one embodiment, the supporting elastic member has two fixing sections, a first connecting section and a second connecting section, the two fixing sections being firmly disposed at the two ends of the supporting rib, one side of each of the two fixing sections being elongated to connect with the first connecting section, the first connecting section being connected with the one end of the first voice coil, another side of each of the two fixing sections being elongated to connect with the second connecting section, the second connecting section being connected with the one end of the second voice coil.

In one embodiment, each of the two first lateral walls has a first lateral magnetic member and a first lateral magnetic plate, the two first lateral magnetic members being disposed at the two sides of the bottom plate, the two first lateral magnetic plates being disposed at the two first lateral magnetic members, each of the two second lateral walls having a second lateral magnetic member and a second lateral magnetic plate, the two second lateral magnetic members being disposed at the two sides of the bottom plate, the two second lateral magnetic plates being disposed at the two second lateral magnetic members, the first magnetic module further having a first magnetic member and a first magnetic plate, the first magnetic member being disposed on the bottom plate, the first magnetic plate being disposed on the first magnetic member, the second magnetic module further having a second magnetic member and a second magnetic plate, the second magnetic member being disposed on the bottom plate, the second magnetic plate being disposed on the second magnetic member.

In one embodiment, each of the two elastic members further has two connecting arms, one end of the connecting arm being connected with the fixing bracket, and another end of the connecting arm being connected with the connecting bracket.

In one embodiment, the connecting arm is a curved structure, and a side, adjacent to the bottom plate, of the connecting bracket has an avoidance gap.

In one embodiment, the outer frame has two fixing portions, which are respectively disposed at a bottom portion of the outer frame with the two elastic members, the fixing portion having a fixing slot, the fixing bracket of the elastic member being firmly disposed in the fixing slot.

In one embodiment, the speaker structure further comprises a damper, which is disposed between a bottom portion of the fixing slot of the outer frame and the fixing bracket of the elastic member.

A third aspect provides a speaker device having the speaker structure, comprising: a case, having a shell and two limiting parts, the shell having an accommodation slot, the limiting parts being disposed at a bottom portion of the accommodation slot, the speaker structure of the first aspect being assembled in the accommodation slot, and the bottom plate of the magnetic carrier and the limiting parts being corresponded to each other.

The present invention provides a speaker structure and a speaker device. The speaker structure of the first embodiment has a magnetic carrier plate and two magnetic modules. The two magnetic modules are arranged on the magnetic carrier, and the two voice coils correspond to the two magnetic modules, so that the vibration sound structure increases the variability of the sound. Then the supporting elastic member and the two auxiliary elastic members are respectively connected between the outer frame and the two voice coils, so as to stabilize the vibration of the two voice coils. The speaker structure of the second embodiment uses the first and second extensions of the outer frame to limit the range in which the magnetic carrier can vibrate upward when the magnetic carrier vibrates upward. The speaker device assembles the speaker structure of the first embodiment or the second embodiment through the case, and the case can limit the downward vibration range of the magnetic carrier of the speaker structure.

The accompanying drawings are incorporated in and constitute a part of this application and, together with the description, serve to explain the principles of the invention in general terms. Like numerals refer to like parts throughout the disclosure.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms “include/including” and “comprise/comprising” are used in an open-ended fashion, and thus should be interpreted as “including but not limited to”. “Substantial/substantially” means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms “include”, “contain”, and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by “include a/an . . . ” does not exclude other same elements existing in the process, the method, the article, or the device which includes the element.

Figure 1:
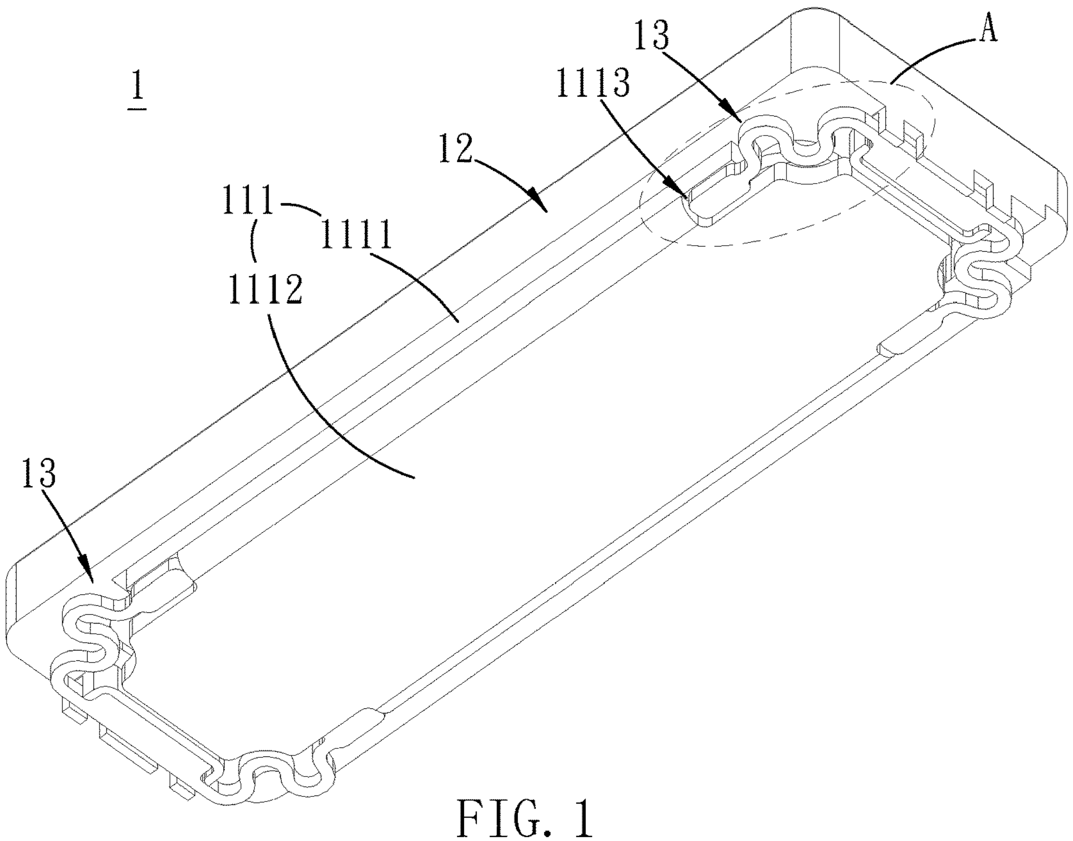
FIG. 1 illustrates a schematic 3-D view of a first embodiment of the speaker structure of the present invention.
Figure 2:
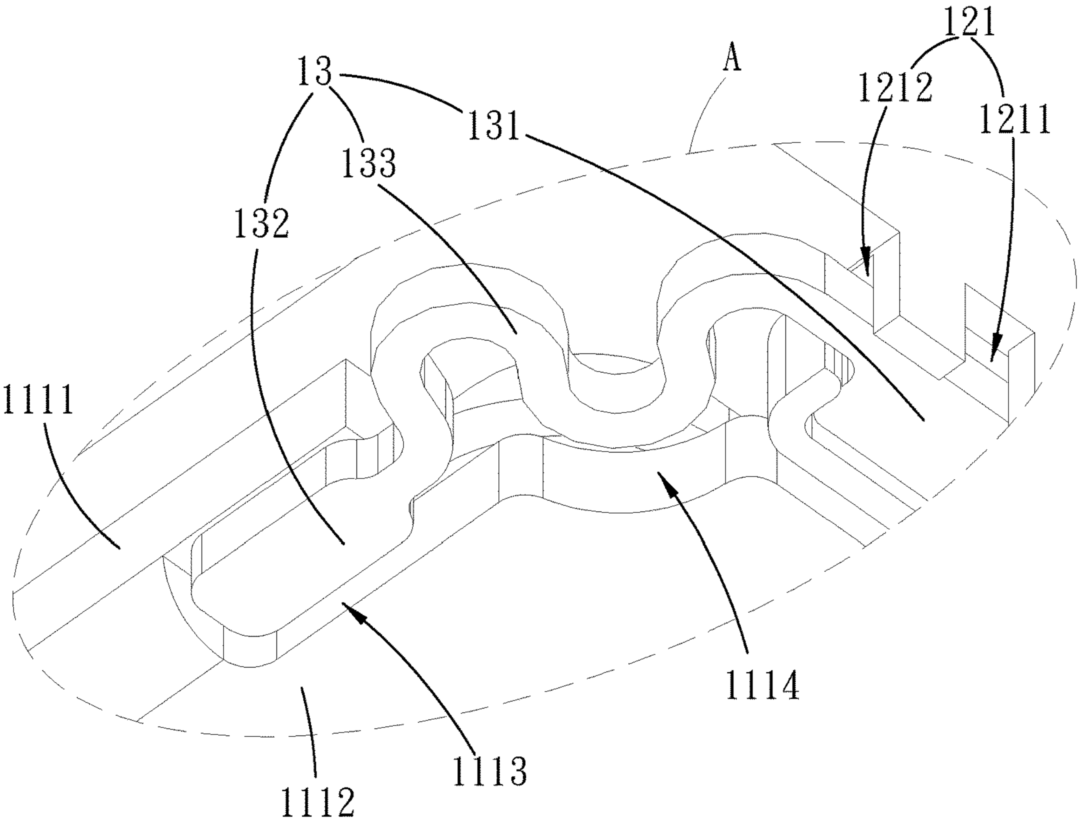
FIG. 2 illustrates an amplified view of an area A in FIG. 1.
Figure 3:
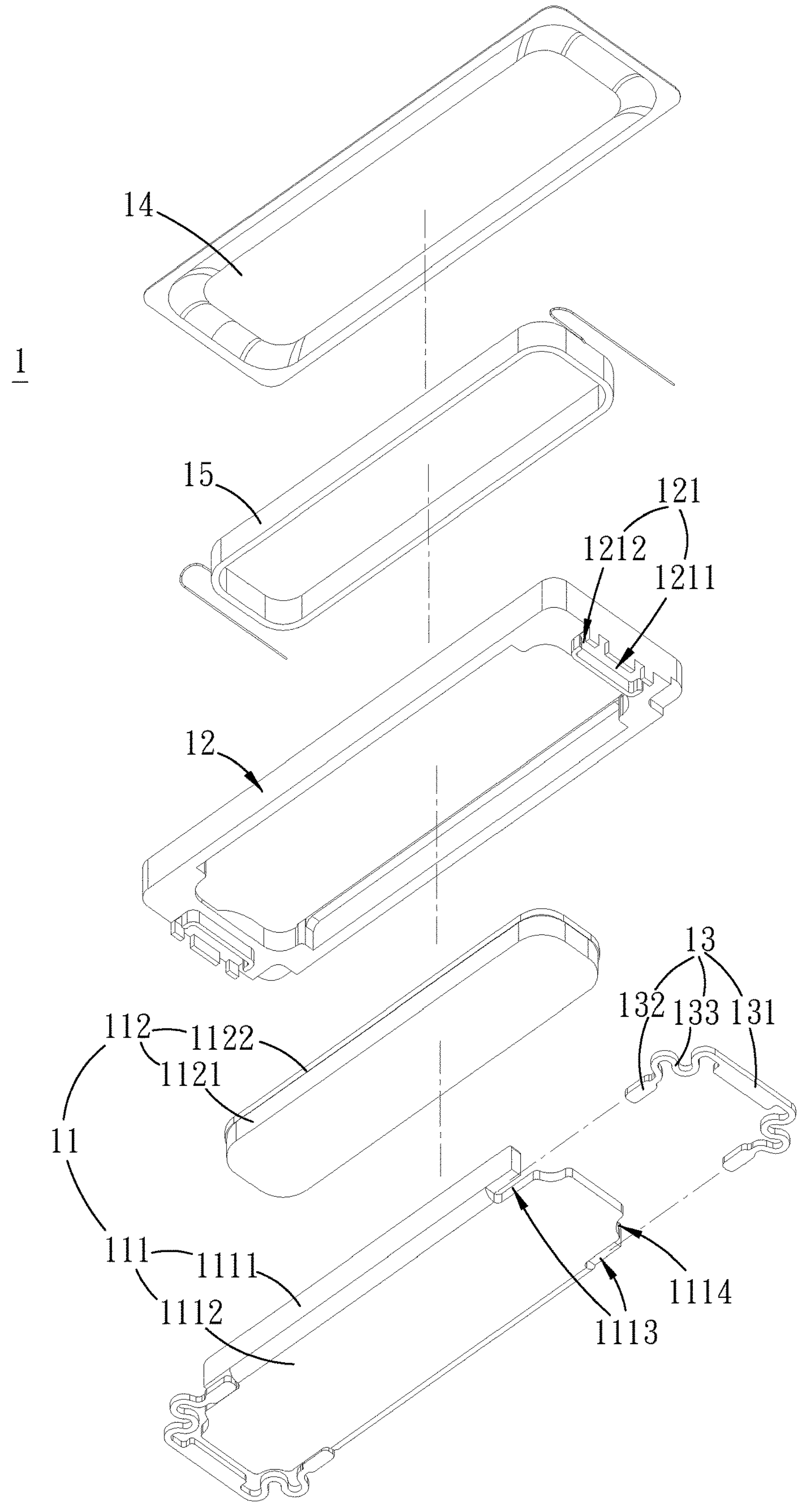
FIG. 3 illustrates an exploded view of the first embodiment of the speaker structure of the present invention.

Please refer to FIG. 1 to FIG. 3, which illustrate a schematic 3-D view of a first embodiment of the speaker structure of the present invention, an amplified view of an area A in FIG. 1 and an exploded view of the first embodiment of the speaker structure of the present invention. As shown in figures, a speaker structure 1 has a magnetic element 11, an outer frame 12, two elastic members 13, a vibration member 14, and a voice coil 15. The magnetic element 11 has a magnetic carrier 111 and a magnetic module 112, and the magnetic carrier 111 has two lateral walls 1111 and one bottom plate 1112, wherein the two lateral walls 1111 are disposed at two sides of the bottom plate 1112, and the magnetic module 112 is disposed on the bottom plate 1112. The outer frame 12 is disposed at a peripheral side of the magnetic element 11. The two elastic member 13 is connected with the magnetic carrier 111 and the outer frame 12, and the two elastic members 13 are respectively disposed at two ends of the magnetic carrier 111. Each of the elastic members 13 has a fixing bracket 131 and two connecting brackets 132, wherein the fixing bracket 131 is disposed at the outer frame 12, and the two connecting brackets 132 are respectively elongated from two sides of the fixing bracket 131, and fixed at two bottom portions of two ends of the two lateral walls 1111 and the two sides of the magnetic carrier 111, further that, the magnetic element 11 is connected into the outer frame 12 in a suspended manner through the two elastic members 13. The vibration member 14 is disposed on the outer frame 12 and located at the magnetic element 11 and the two elastic members 13. The voice coil 15 is disposed underneath the vibration member 14 and located among the magnetic module 112 and the two lateral walls 1111 of the magnetic carrier 111.

In the present embodiment, the bottom plate 1112 of the magnetic carrier 111 has four notches 1113, which are respectively disposed at four corners of the bottom plate 1112, and the four ends of the two lateral walls 1111 are respectively elongated to four positions where are above the four notches 1113. That is, each of the notch 1113 is located at a bottom portion of one end of the lateral wall 1111 and the corner of the bottom plate 1112. The two connecting brackets 132 of the two elastic members 13 are respectively and firmly disposed at the two bottom portions of the two ends of the two lateral walls 1111. In other words, the two elastic members 13 are connected with the two ends of the magnetic carrier 111 and the outer frame 12, wherein the two ends are not with the two lateral walls 1111. The two connecting brackets 132 of the two elastic members 13 are able to firmly position in the notches 1113 by means of adhering or welding. The magnetic element 11 remains in an inner space of the outer frame 12 of the speaker structure 1 in a suspension manner. The connecting brackets 132 of the elastic members 13 being connected with and firmly positioned in the magnetic element 11 will be better for the balance of the entire structure, so as to avoid the problem of large side-to-side swings while the magnetic element 11 is in the process of vibrating up and down.

The outer frame 12 has two fixing portions 121, which are respectively disposed at a bottom portion of the outer frame 12 with the two elastic members 13, the fixing portion 121 has a fixing slot 1211, and the fixing bracket 131 of the elastic member 13 is firmly disposed in the fixing slot 1211. Each of the elastic members 13 has two connecting arms 133, and one end of the connecting arm 133 is connected with one side of the fixing bracket 131, further, another end of the connecting arm 133 is connected with a connecting bracket 132. The fixing bracket 131 of the elastic member 13 is firmly disposed in the fixing slot 1211, and two sides of the fixing slot 1211 has two openings 1212. The two connecting arms 133 are outwardly extended from the two sides of the fixing bracket 13 to be through the two openings 1212 of the fixing slot 1211, and the connecting arms 133 are bent to outwardly extend for connecting with the two connecting brackets 132. More, the fixing bracket 131, the two connecting brackets 132 and the two connecting arms 133 are integrated as one body.

Accordingly, the connecting arm 133 is an s-type structure, and it is on demand. The shape of the connecting arm 133 should assure that the vibration frequency of the overall magnetic element 11 and the vibration frequency of the magnetic element 11 affecting the voice coil 15 to drive the vibration member 14 are close to each other, in order to form mutual cancellation, and avoid the vibration of the magnetic element 11 to affect the vibration and sound of the vibration component 14. A side, adjacent to the bottom plate 1112, of the connecting arm 133 has an avoidance gap 114, which is located on a moving path of the connecting arm 33 vibrating up-and-down or swinging side-to-side. In the process of the elastic member 13 absorbing the vibrations of the magnetic element 11, the up-and-down vibration or side-to-side swing of the connecting arm 133 of the elastic member 13 may not be interfered by the bottom plate 1112 of the magnetic carrier 111. In addition, the elastic member 13 is made of stainless or other elastic materials.

As to the present embodiment, during the power-on operation of the speaker structure 1, and the audio current passing through the voice coil 15, the voice coil 15 will be affected by the magnetic field force of the magnetic element 11, so that the voice coil 15 drives the vibrating element 14 to move and produce sound. In the meantime, the magnetic element 11 will also be subjected to the reaction force of the voice coil 15. The force received by the magnetic element 11 and the voice coil 15 is equal in magnitude, and the direction of the force is opposite, so that the magnetic element 11 is opposite to the voice coil 15 in vibration. While the magnetic element 11 is connected to the outer frame 12 through two elastic members 13, the vibration force of the magnetic element 11 is transmitted to the outer frame 12 through the two elastic members 13. As a result, the vibration force of the magnetic element 11 is absorbed by the elastic members 13 in order to highly decrease the affection to the outer frame 12, so as to the vibration member 14.

In the process of moving the speaker structure 1, the magnetic element 11 remains in the outer frame 12 in a suspension manner through the two elastic members 13, and obviously the two elastic members 13 play the roles of dampers for balancing the movements or vibrations of the magnetic element 11 in the speaker structure 1. Further, the two elastic members 13 are able to reduce the interferences and affections from environments as well.

Figure 4:
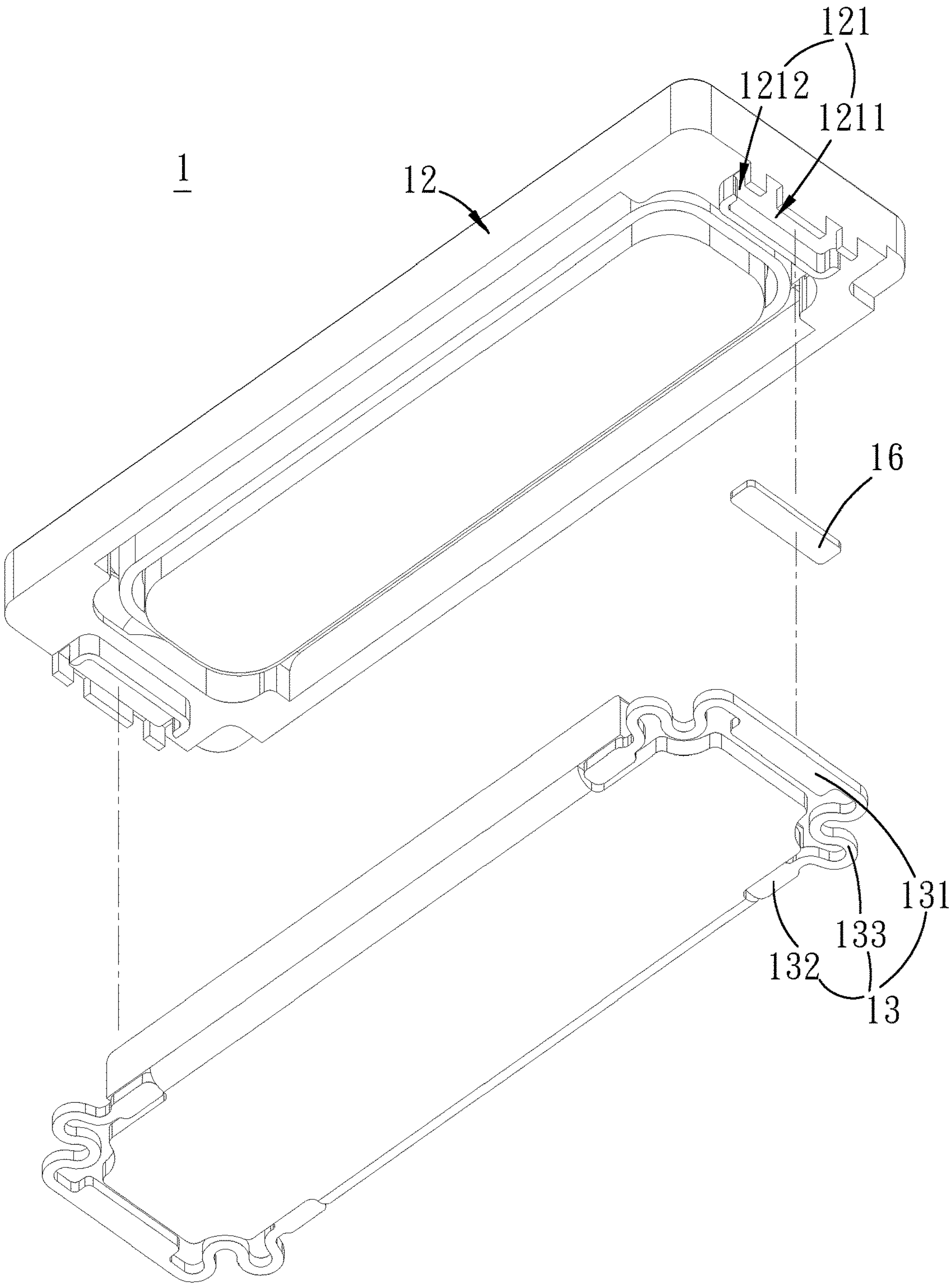
FIG. 4 illustrates a schematic 3-D view of a second embodiment of the speaker structure of the present invention.

With reference to FIG. 4, which illustrates a schematic 3-D view of a second embodiment of the speaker structure of the present invention. As shown in figure, compared with the first embodiment, the second embodiment further has a damper 16. The damper 16 is disposed between a bottom portion of the fixing slot 1211 of the outer frame 12 and the fixing bracket 131 of the elastic member 13. The damper 16 can absorb the vibrations from the elastic members 13, in order to decrease the vibrations of the elastic members 13 to the outer frame 12. Additionally, the damper 16 is made of silicone material, but not subject to.

Figure 5:
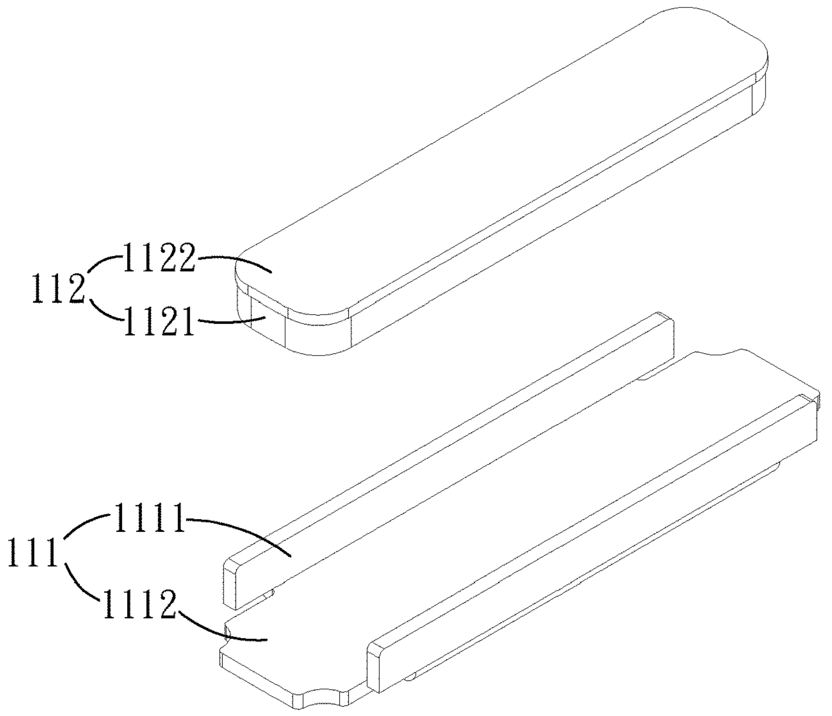
FIG. 5 illustrates a schematic view of a magnetic carrier.
Figure 6:
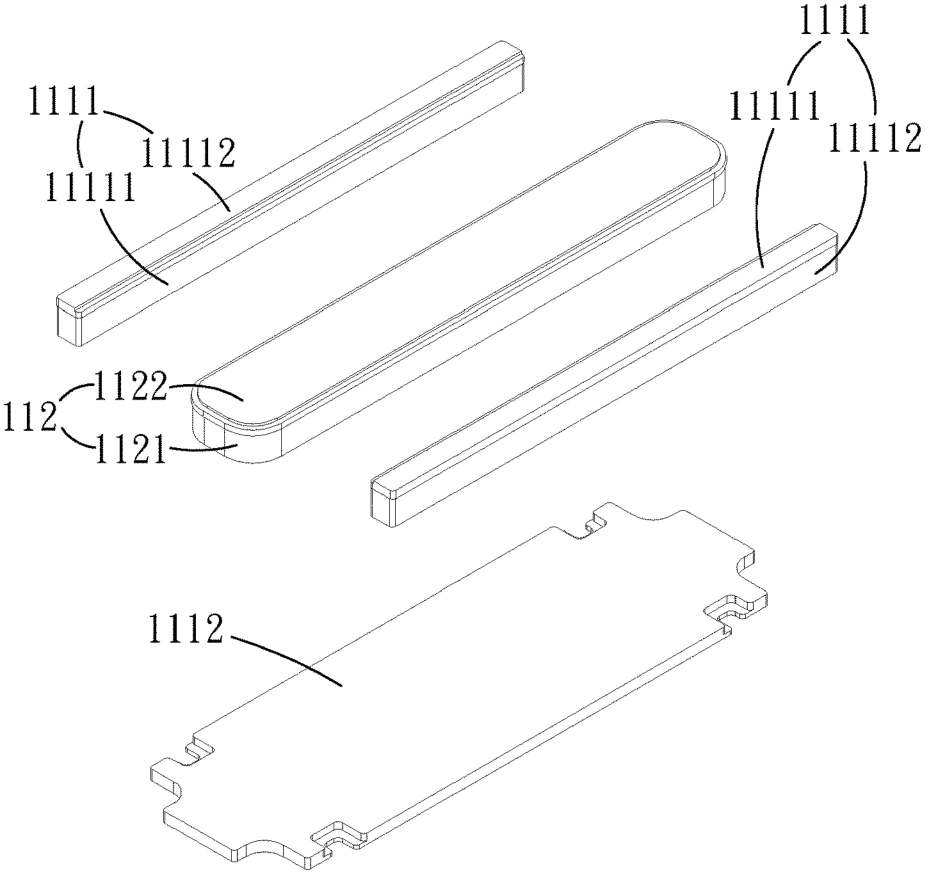
FIG. 6 illustrates a another schematic view of the magnetic carrier.

Please refer to FIG. 5 and FIG. 6, which illustrate a schematic view of the magnetic carrier and another schematic view of the magnetic carrier. The embodiment provides different kinds of the magnetic elements 11. As shown in FIG. 5, the first kind of the magnetic element 11 has a magnetic carrier 111 and a magnetic module 112. The magnetic carrier 111 has two lateral walls 1111 and a bottom plate 1112, wherein the two lateral walls 1111 are disposed at two sides of the bottom plate 1112, and the two lateral walls 1111 and the bottom plate 1112 are integrated as one member. The magnetic module 112 further has a magnetic body 1121 and a magnetic plate 1122, wherein the magnetic body 1121 is disposed on the bottom plate 1112, and the magnetic plate 1122 is disposed on the magnetic body 1121. Compared with the first kind of magnetic element, the second kind of the magnetic element has the two lateral walls 1111 that differ from the two lateral walls of the first kind of magnetic element. The two lateral walls 1111 of the second kind of the magnetic element 11 are assembled with the bottom plate 1112. The two lateral walls 1111 have two lateral magnetic members 11111 and two lateral magnetic plates 11112, wherein the two lateral magnetic members 11111 are disposed at two sides of the bottom plate 1112, and the two lateral magnetic plates 11112 are disposed on the two lateral magnetic members 11111. The embodiment is not to limit the arrangement for the magnetic element 11, and it is adjustable for users' needs to apply to the speaker structure 1.

Figure 7:
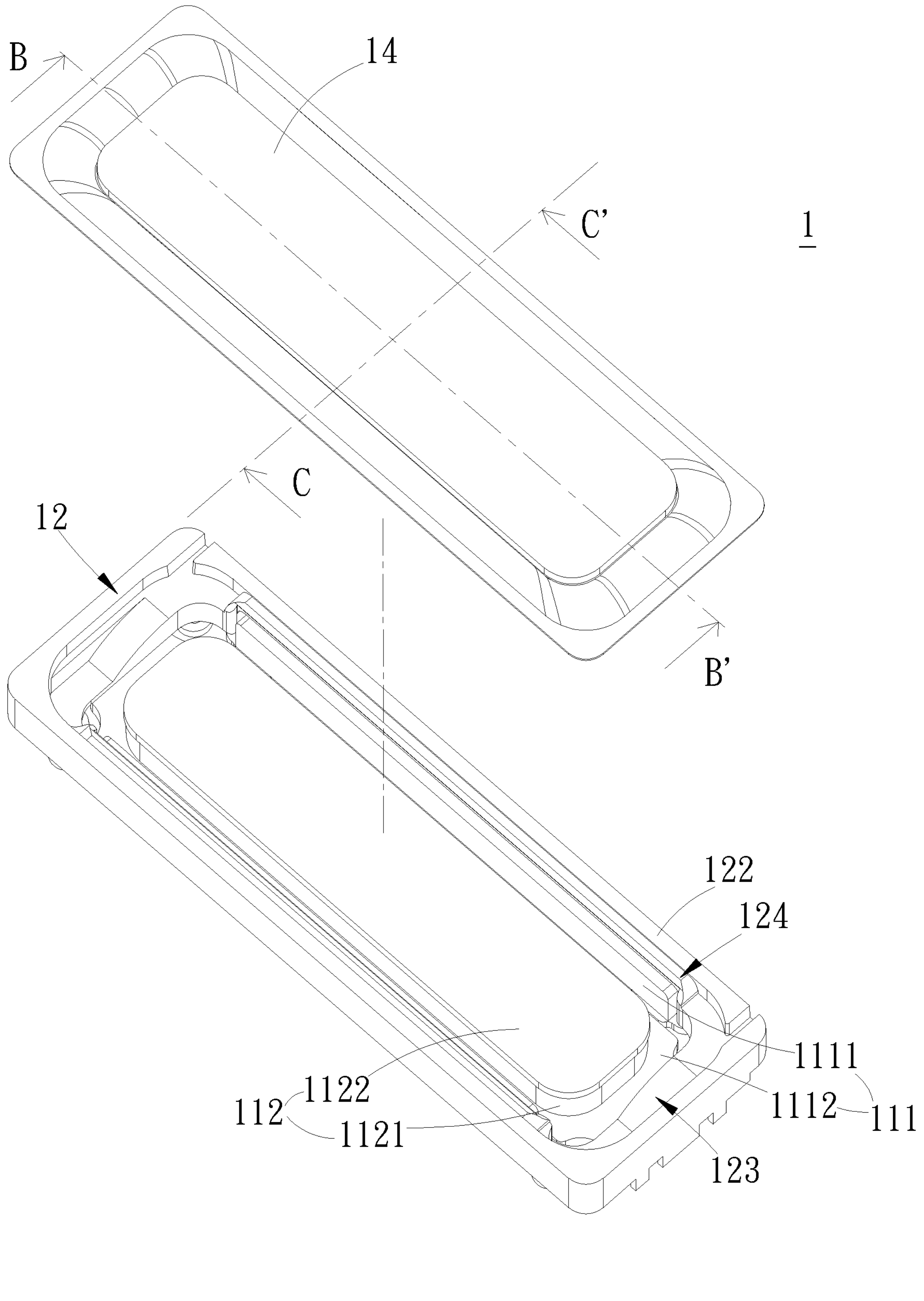
FIG. 7 illustrates an exploded view of a third embodiment of the speaker structure of the present invention.
Figure 8:
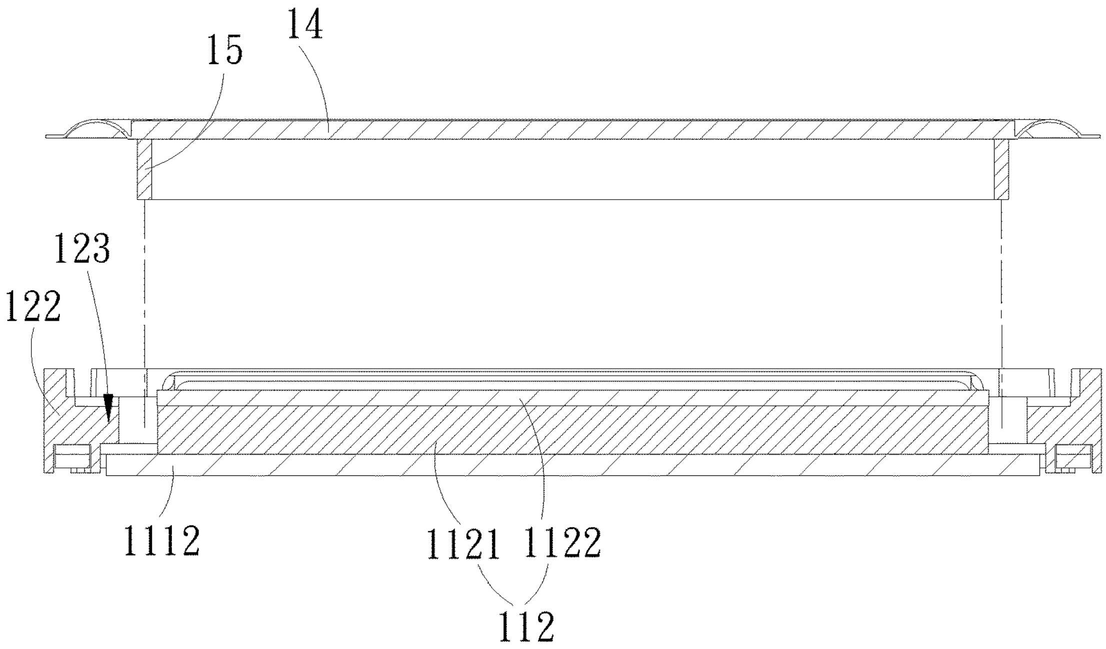
FIG. 8 illustrates a sectional view of a line B-B' of FIG. 7.
Figure 9:
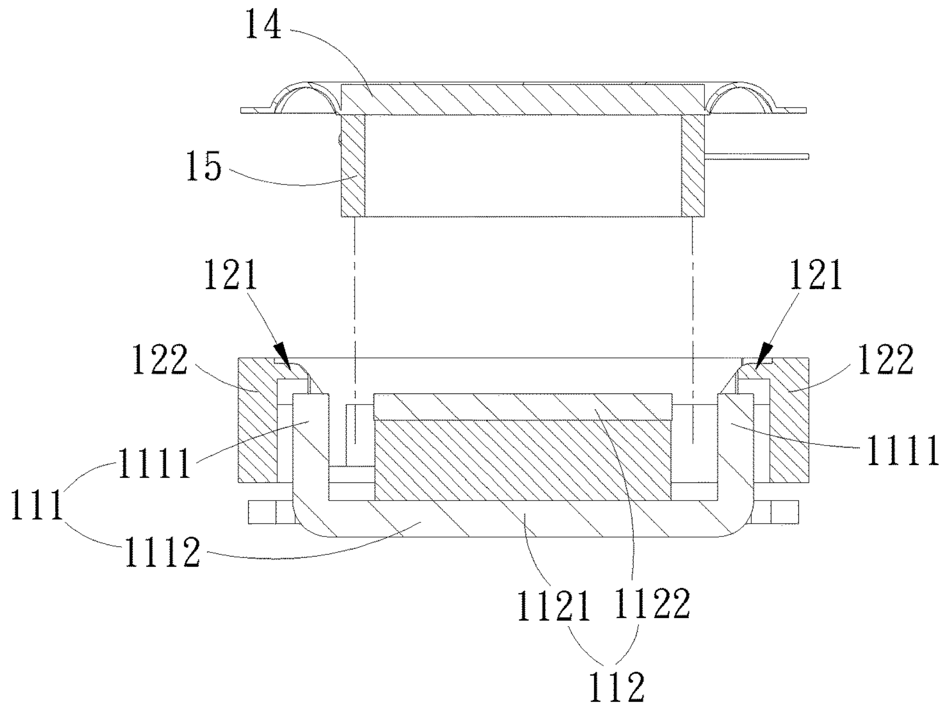
FIG. 9 illustrates a sectional view of a line C-C' in FIG. 7.

In regard to FIG. 7 to FIG. 9, which illustrate an exploded view of a third embodiment of the speaker structure of the present invention, a sectional view of a line B-B' of FIG. 7 and a sectional view of a line C-C' in FIG. 7. As shown in figures, the difference between the third embodiment and the first embodiment is the structure of the outer frame 12. Regarding FIG. 8, in the third embodiment, the speaker structure 1 includes a magnetic element 11 including a magnetic carrier 111 and a magnetic module 112. The magnetic carrier 111 has two lateral walls 1111 and a bottom plate 1112. Two side walls 1111 are disposed on both sides of the bottom plate 1112. The magnetic module 112 is disposed on the bottom plate 1112. The outer frame 12 includes a frame member 122 and a first extension portion 123. The first extension portion 123 extends inwardly from the inner side of the frame member 122 adjacent to the two side walls 1111 without the magnetic carrier 111. The first extension portion 123 is located above the bottom plate 1112 of the magnetic carrier 111. In this way, the first extension portion 123 can limit the vertical upward vibration displacement height of the bottom plate 1112 of the magnetic carrier 111.

In accordance with FIG. 9, which is the third embodiment as well. The outer frame 12 has a frame member 122 and a second extension portion 124, the second extension portion 124 is inwardly elongated from an inner side of a side of the frame member 122, wherein the side is adjacent to the magnetic carrier 111, the second extension portion 124 is above the lateral wall 1111. Therefore, the second extension portion 124 can limit the vertical upward vibration displacement height of the two lateral walls 1111 of the magnetic carrier 111.

In addition, two elastic members 13 are connected between the magnetic carrier plate 111 and the outer frame 12. Two elastic members 13 are relatively positioned at the two sides of the magnetic carrier 111. The magnetic element 11 is arranged in the outer frame 12 by two elastic members 13 in a suspended connection. A vibration assembly 14 is arranged on outer frame 12. The vibrating assembly 14 is disposed on the magnetic element 11 and the two elastic members 13. The voice coil 15 is disposed under the vibrating component 14, and the voice coil 15 is located between the magnetic module 112 and the two side walls 1111 of the magnetic carrier 111.

The embodiment does not limit the structural combination of the above-mentioned single technical feature or multiple technical features. For example, the combination of the elastic member 13 of the first embodiment with the notch 1113 of the magnetic carrier 111, the combination of the elastic member 13 and the damper 16 of the second embodiment, the combination of frame member 122 and supporting frame 125 in the fourth embodiment, the combination of frame member 122 and auxiliary elastic member 17 in the fifth embodiment, the combination of the elastic member 13 of the sixth embodiment with the accommodating notches 1115 of the magnetic carrier 111, the outer side of the connecting bracket 132 of the elastic member 13 of the seventh embodiment extending outward, or the combination of the two voice coils 15 of the eighth embodiment corresponding to the frame member 122 and the auxiliary elastic member 17 and the combination of the supporting rib 126 and the supporting elastic member 18.

Figure 10:
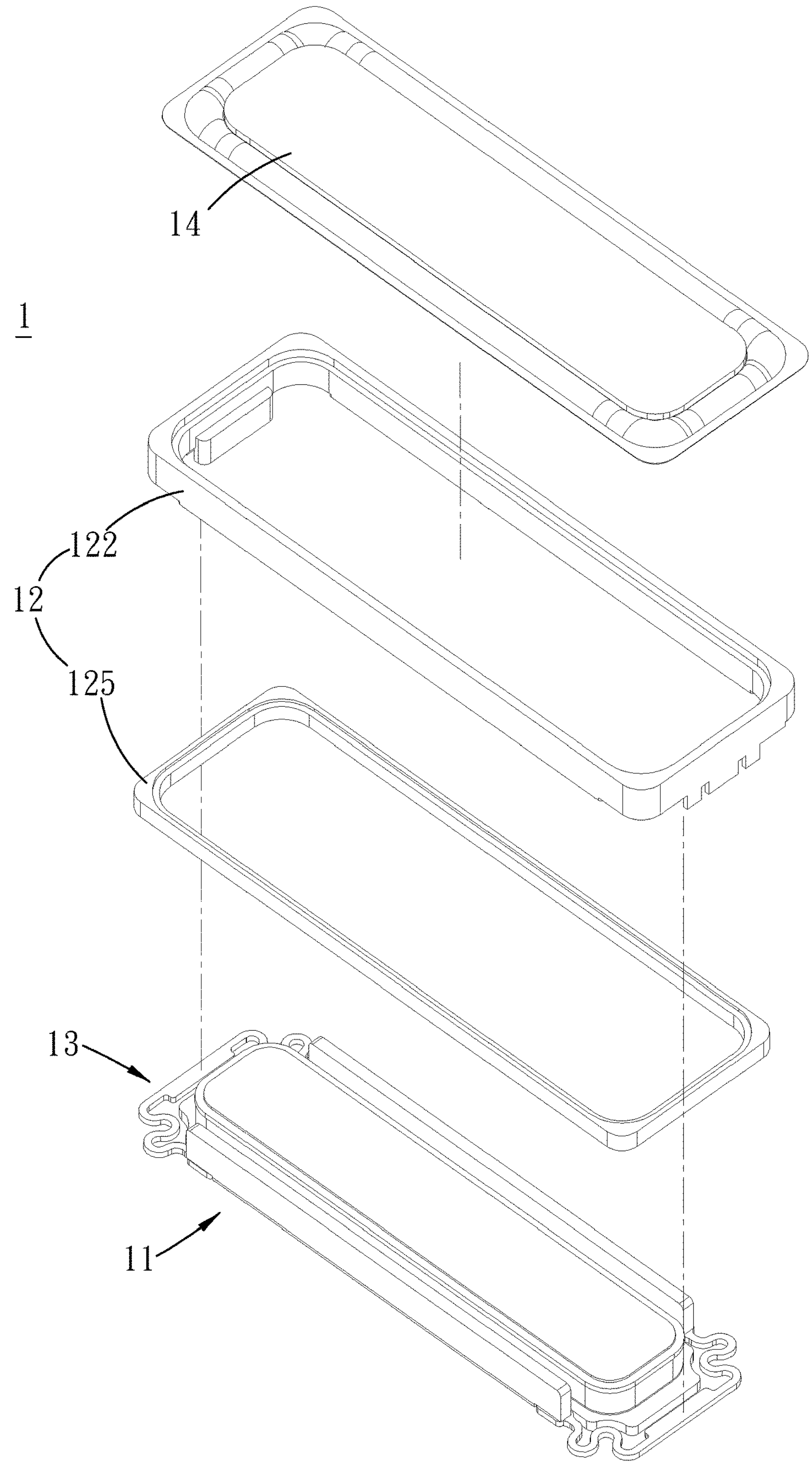
FIG. 10 illustrates an exploded view of a fourth embodiment of the speaker structure of the present invention.

As for FIG. 10, which illustrates an exploded view of a fourth embodiment of the speaker structure of the present invention. The difference between the fourth embodiment and the first embodiment is a supporting frame. The outer frame 12 of the fourth embodiment has a frame member 122 and a supporting frame 125, wherein the supporting frame 125 is in the frame member 122, in order to assist in supporting the structure of the frame member 122. The supporting frame 125 is disposed in the frame member 122, that is, the supporting frame 125 can be a main body, then the frame member 122 is disposed on the supporting frame 125 through injection molding. Through the supporting frame 125, the structure of the outer frame 12 is strengthened. As to the fourth embodiment, the outer frame 12 is made of metal, and it is not only increases the structural strength of the outer frame 12, but also serves as a magnetically conductive washer.

Figure 11:
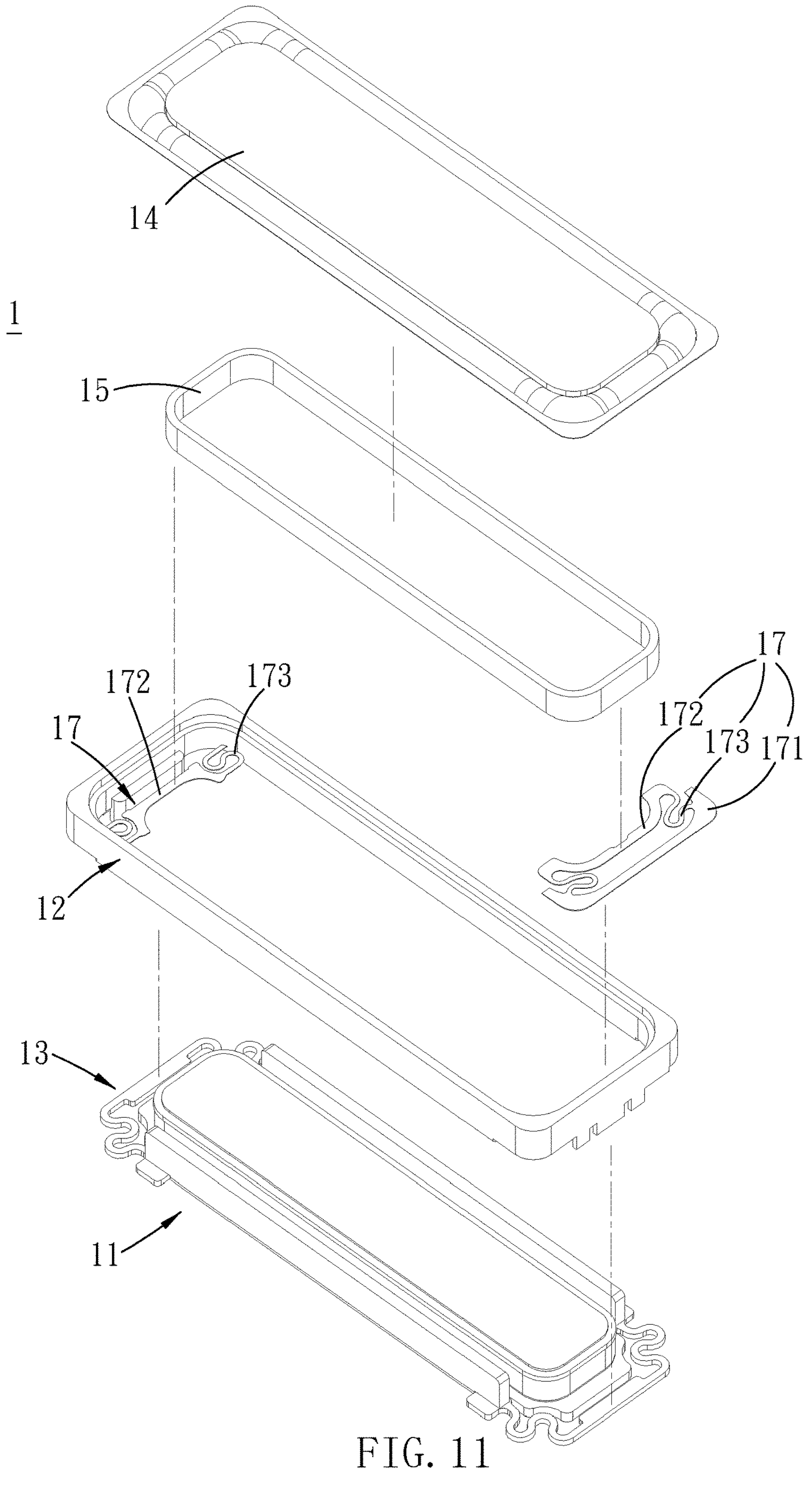
FIG. 11 illustrates an exploded view of a fifth embodiment of the speaker structure of the present invention.

Referring to FIG. 11, which illustrates an exploded view of a fifth embodiment of the speaker structure of the present invention. Compared to the first embodiment, the fifth embodiment has two auxiliary elastic members. The speaker structure 1 of the fifth embodiment further has two auxiliary elastic members 17, wherein the two auxiliary elastic members 17 are connected with voice coil 15 and the outer frame 12, and correspond to two ends of the voice coil 15, wherein the two ends are not adjacent to the two lateral walls 1111 of the magnetic carrier 111. The auxiliary elastic member 17 has a fixing portion 171 and a connecting portion 172, wherein two sides of the fixing portion 171 are elongated to connect with two sides of the connecting portion 172, the fixing portion 171 is disposed in the outer frame 12, and the connecting portion 172 is disposed at a bottom portion of the voice coil 15. The auxiliary elastic member 17 can be, but does not limit to be, made of metal material. That is, the auxiliary elastic member 17 has a better elastic recovery force, and can stably stabilize the voice coil 15 in the magnetic element 11 to operate. In addition, in other embodiments, the auxiliary elastic member 17 can be used for conducting electricity, so as to control the operating state of the magnetic field of the voice coil 15 in the magnetic element 11.

In the fifth embodiment, the fixing portion 171 of the auxiliary elastic member 17 is firmly positioned in the outer frame 12. The length of the fixing portion 171 is close to the length of a short side of the outer frame 12, in order to let the fixing portion 171 be strong enough for supporting the connecting portion 172. Consequently, the connecting portion 172 will be power enough to support under the voice coil 15. Besides, the auxiliary elastic member 17 has two connecting arm portions 173 obviously. The connecting arm portion 173 is an s-type structure. The two connecting arm portions 173 are extended outwardly from the two sides of the fixing portion 171 to connect with the two sides of the connecting portion 172. Further, the fixing portion 171, the connecting portion 172 and the two connecting arm portions 173 are integrated as one body. The shape of the auxiliary elastic member 17 can be adjusted according to the needs of users, and the shape of the auxiliary elastic member 17 needs to ensure the vibration frequency and stability of the entire voice coil 15. The auxiliary elastic member 17 may or may not be made of metal material, that is, the auxiliary elastic member 17 has better elastic recovery force and can stably operate the voice coil 15 in the magnetic element 11.

Figure 12:
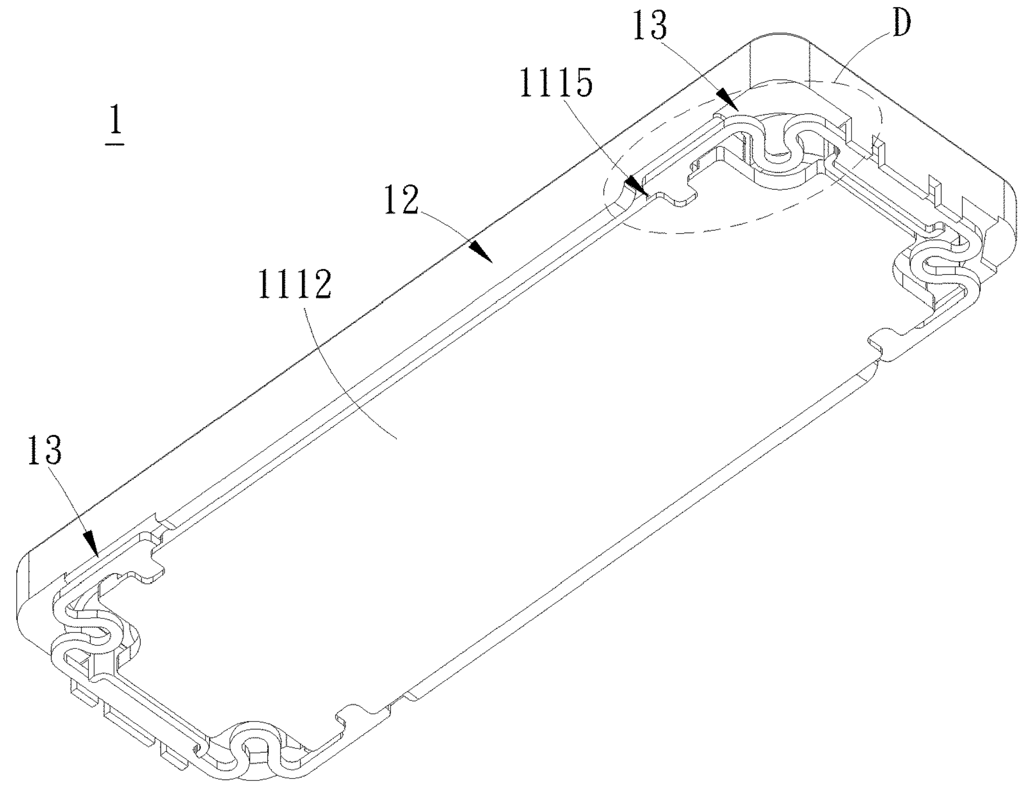
FIG. 12 illustrates a schematic 3-D view of a sixth embodiment of the speaker structure of the present invention.
Figure 13:
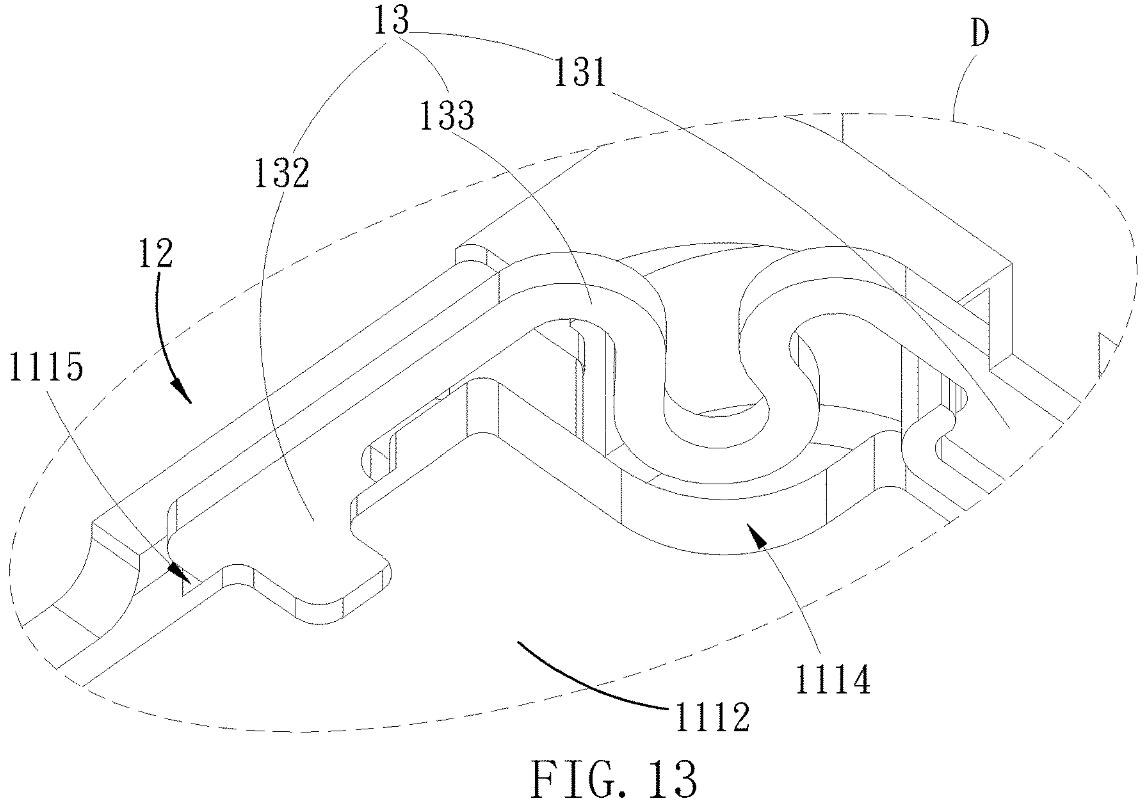
FIG. 13 illustrates an amplified view of an area D in FIG. 12.
Figure 14:
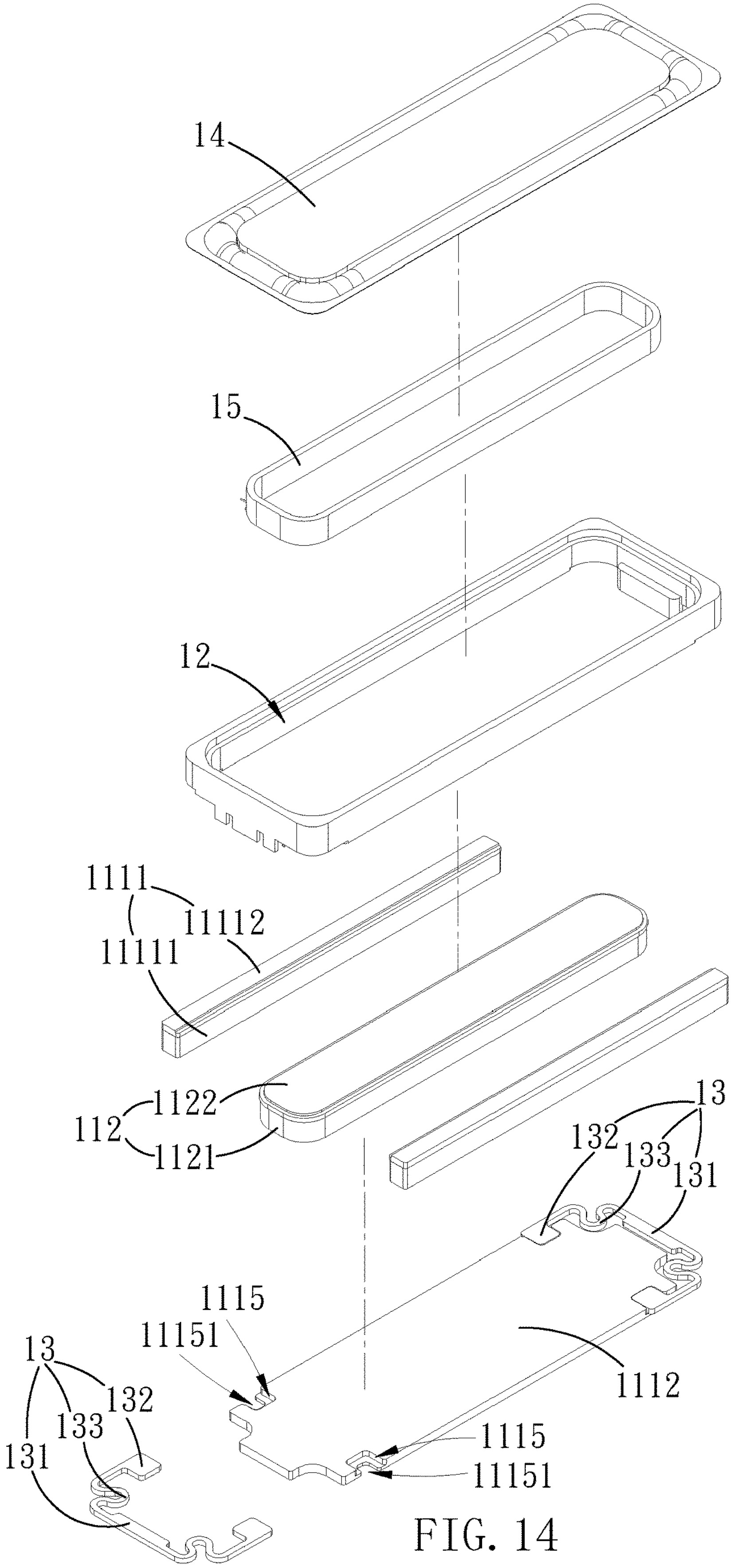
FIG. 14 illustrates an exploded view of the sixth embodiment of the speaker structure of the present invention.

Please refer to FIG. 12 to FIG. 14, which illustrate a schematic 3-D view of a sixth embodiment of the speaker structure of the present invention, an amplified view of an area D in FIG. 12 and an exploded view of the sixth embodiment of the speaker structure of the present invention. Compared to the first embodiment, the different part of the sixth embodiment is a structure for the magnetic carrier 111 connecting with the two elastic members 13. For the sixth embodiment, the bottom plate 1112 of the magnetic carrier 111 has four accommodation notches 1115, which are respectively disposed at four corners of the bottom plate 1112, wherein the four ends of the two lateral walls 1111 are elongated to four positions where are above the four accommodation notches 1115, and the two connecting brackets 132 of the two elastic members 13 are embedded into the four accommodation notches 1115 and disposed at the two bottom portions of the two ends of the two lateral walls 1111. In addition, two lateral sides, far away from the magnetic carrier 111, of the two connecting brackets 132, of each of the two elastic members 13 are elongated outwardly to be beneath the outer frame 12, and a vertical vibration path of the elastic member 13 and a vertical vibration path of the connecting bracket 132 are limited by the outer frame 12.

As for the sixth embodiment, one side, adjacent to the bottom plate 1112 of the magnetic carrier 111, the connecting bracket 132 of the elastic member 13 is elongated inwardly, in order to let the connecting bracket 132 be embedded in the accommodation notches 1115 of the bottom plate 1112, and a bottom portion of an end of the lateral wall 1111 cover an upper notch of the accommodation notch 1115, so that the elastic member 13 is limited in the accommodation notch 1115. The connecting bracket 132 of the elastic member 13 is firmly disposed in the accommodation notch 1115 through welding or adhering. The bottom portion of the accommodation notch 1115 has an opening 11151 for firmly connecting the connecting bracket 132 of the elastic member 13 with the bottom plate 1112. More, the elastic member of the speaker structure 1 of the sixth embodiment has two connecting arms 133 as well, but it will not be described any further. The speaker structure 1 of the present embodiment can be based on the needs of users to optionally choose one or assembly of the damper 16, the first or second kind of the magnetic element 11, the first extension position 123 and/or the second extension position 124 in the frame member 122, and the auxiliary elastic member 17. Namely, the embodiment may not limit thereto.

Figure 15:
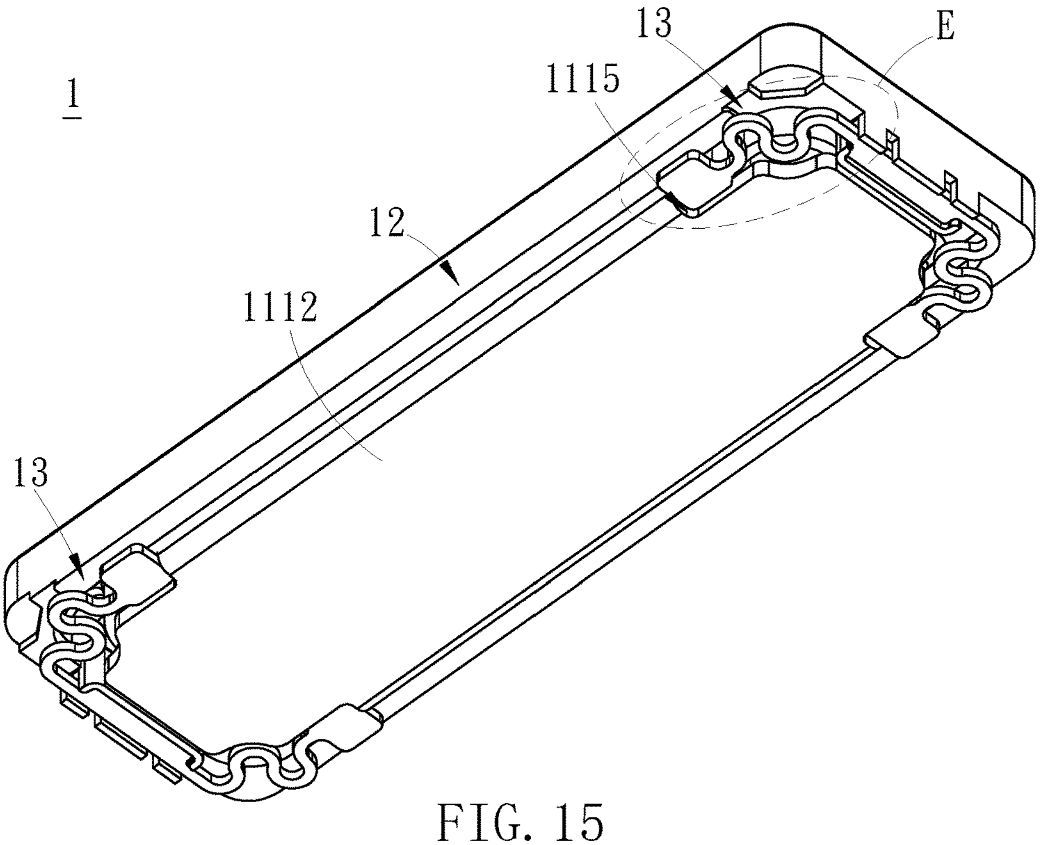
FIG. 15 illustrates a schematic 3-D view of a seventh embodiment of the speaker structure of the present invention.
Figure 16:
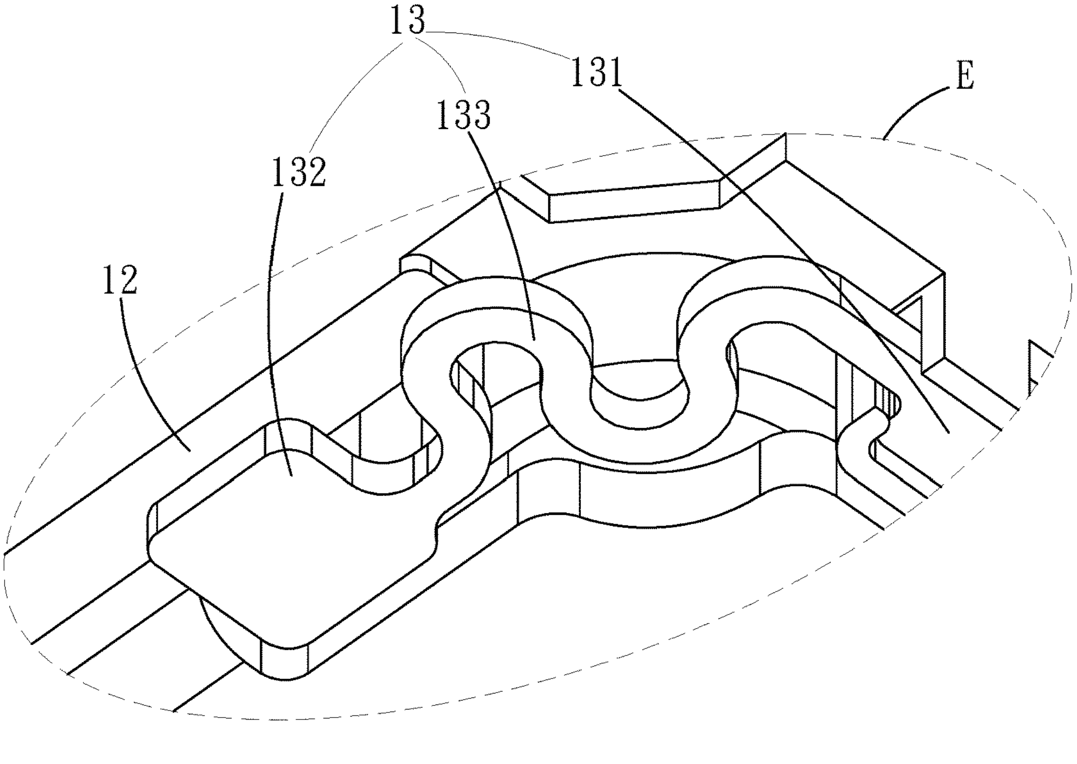
FIG. 16 illustrates an amplified view of an area E in FIG. 15.

In accordance with FIG. 15 and FIG. 16, which illustrate a schematic 3-D view of a seventh embodiment of the speaker structure of the present invention and an amplified view of an area E in FIG. 15. As shown in figures, the difference between the seventh embodiment and the first embodiment is the connecting bracket 132. In the seventh embodiment, a lateral side, far away from the magnetic carrier 111, of the two connecting brackets 132 of each of the two elastic members 13 is elongated outwardly to be beneath the outer frame 12, a vertical/up-and-down vibration path of the elastic member 13 and a vertical vibration path of the connecting bracket 132 are limited by the outer frame 12. Hence, the amplitude of the upward vibration of the elastic member 13 is limited.

Figure 17:
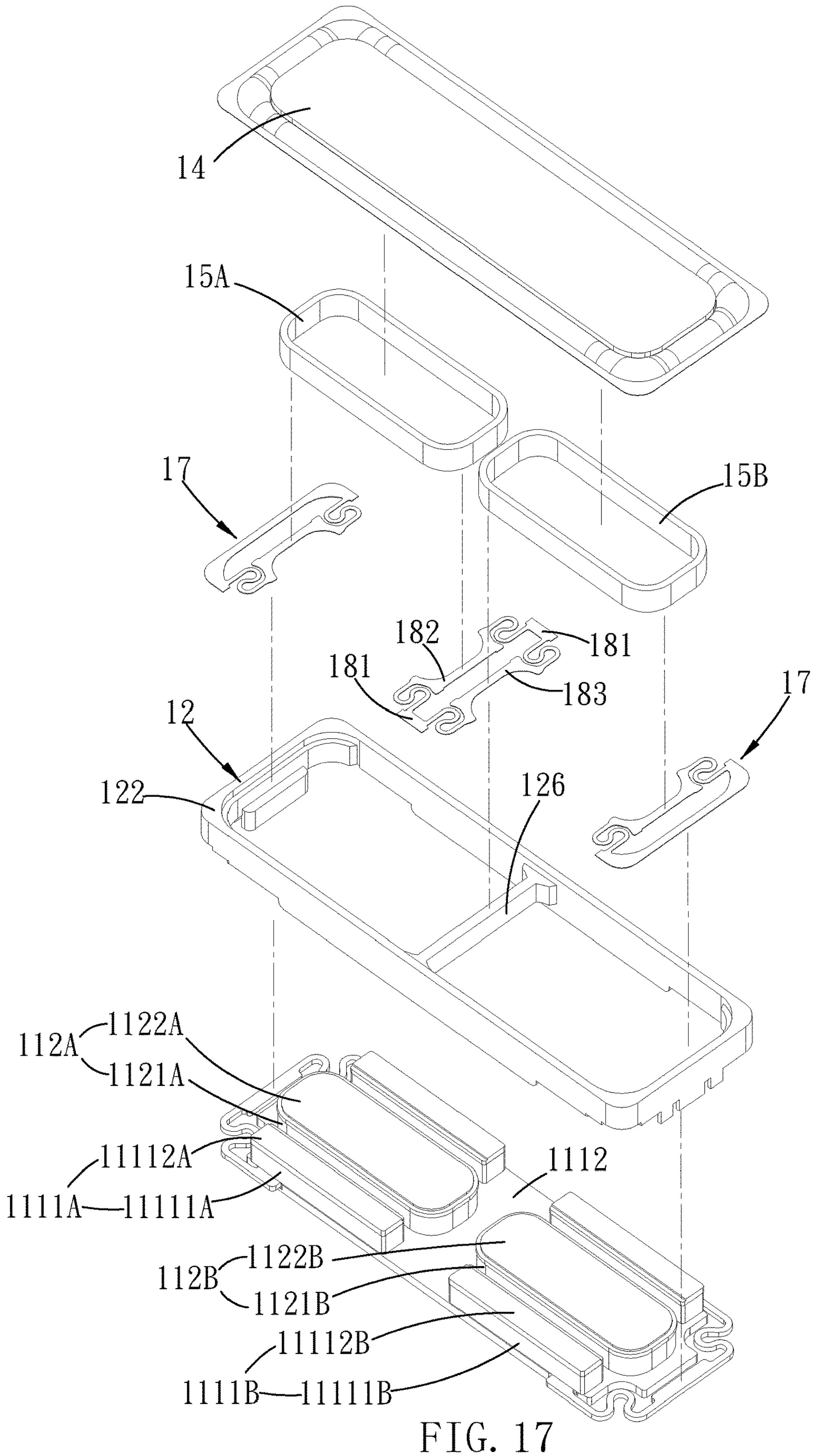
FIG. 17 illustrates an exploded view of an eighth embodiment of the speaker structure of the present invention.
Figure 18:
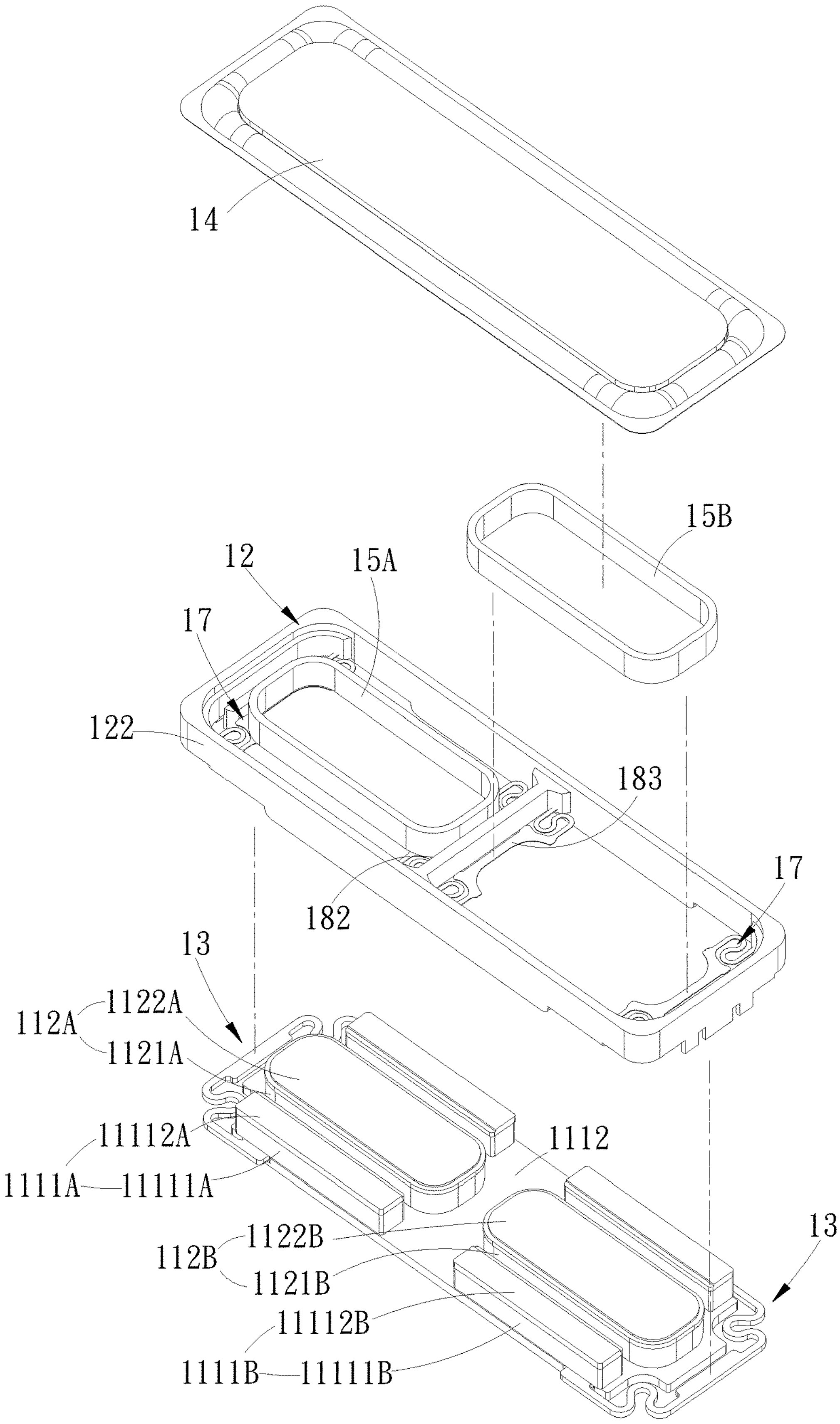
FIG. 18 illustrates another exploded view of the eighth embodiment of the speaker structure of the present invention.

As for FIG. 17 and FIG. 18, which illustrate an exploded view of an eighth embodiment of the speaker structure of the present invention and another exploded view of the eighth embodiment of the speaker structure of the present invention. As shown in figures, compared to the first embodiment, the number of the magnetic element 11 of the eighth embodiment differs from the first embodiment's. As to the eighth embodiment, the magnetic module 112 further has a first magnetic module 112A and a second magnetic module 112B, the first magnetic module 112A and the second magnetic module 112B are disposed on the bottom plate 1112 of the magnetic carrier (111) in order, wherein each of the two lateral walls 1111 of the magnetic carrier 111 has a first lateral wall 1111A and a second lateral wall 1111B, the first lateral wall 1111A and the second lateral wall 1111B on one side of the bottom plate 1112, the two first lateral walls 1111A are disposed at the two sides of the first magnetic module 112A, and the two second lateral walls 1111B are disposed at the two sides of the second magnetic module 112B. Besides, the voice coil 15 has a first voice coil 15A and a second voice coil 15B, which are disposed beneath the vibration member 14, the first voice coil 15A is between the first magnetic module 112A and the two first lateral walls 1111A of the magnetic carrier 111, and the second voice coil 15B is between the second magnetic module 112B and the two second lateral walls 1111B of the magnetic carrier 111.

As mentioned above, the outer frame 12 further has a frame member 122 and a supporting rib 126, two ends of the supporting rib 126 are connected with two inner walls of the frame member 122 respectively, the supporting rib 126 is disposed between the first voice coil 15A and the second voice coil 16A. Based on the above, the outer frame 12 further includes a frame member 122 and supporting ribs 126. The frame member 122 is located on the peripheral side of the magnetic element 11. Both ends of the supporting rib 126 are respectively connected and fixed to the inner walls on both sides of the frame member 122. The supporting rib 126 is located between the first voice coil 15A and the second voice coil 15B. In other words, the supporting rib 126 is also located between the first magnetic module 112A and the second magnetic module 112B. In addition, the speaker structure 1 further comprises a supporting elastic member 18 and two auxiliary elastic members 17, the supporting elastic member 18 is firmly disposed at the supporting rib 126, two sides of the supporting elastic member 18 are connected with one end of the first voice coil 15A and one end of the second voice coil 15B, one end of one of the auxiliary elastic members 17 is connected with the other end of the first voice coil 15A, wherein the other end of the first voice coil 15A is neighbor to the outer frame 12, one end of another of the auxiliary elastic members 17 is connected with the other end of the second voice coil 15B, wherein the other end of the second voice coil 15B is adjacent to the outer frame 12. In other words, each auxiliary elastic member 17 includes a fixing portion 171 and a connecting portion 172. Both ends of the fixing portion 171 are extended and connected to both ends of the connecting portion 172. The fixing portion 171 is arranged in the outer frame 12. The connecting portion 172 is disposed at the bottom of the first voice coil 15A (or the second voice coil 15B). The two auxiliary elastic members 17 correspond to the other end of the first voice coil 15A not adjacent to the two first side walls 1111A of the magnetically permeable carrier plate 111 and the two second sides not adjacent to the magnetically permeable carrier plate 111 The other end of the second voice coil 15B of the wall 1111B. The supporting elastic member 18 has two fixing sections 181, a first connecting section 182 and a second connecting section 183, the two fixing sections 181 are firmly disposed at the two ends of the supporting rib 126, one side of each of the two fixing sections 181 is elongated to connect with the first connecting section 182, the first connecting section 182 is connected with the one end of the first voice coil 15A, another side of each of the two fixing sections 181 is elongated to connect with the second connecting section 183, the second connecting section 183 is connected with the one end of the second voice coil 15B. The two elastic members 13 are connected between the magnetic carrier 111 and the outer frame 12. The two elastic pieces 13 are oppositely located at two ends of the magnetic carrier 111. The magnetic component 11 is suspended and arranged in the outer frame 12 through the two elastic members 13.

Else, each of the two first lateral walls 1111A has a first lateral magnetic member 11111A and a first lateral magnetic plate 11112A, the two first lateral magnetic members 11111A are disposed at the two sides of the bottom plate 1112, the two first lateral magnetic plates 11112A are disposed at the two first lateral magnetic members 1111A, each of the two second lateral walls 1111B has a second lateral magnetic member 11111B and a second lateral magnetic plate 11112B, the two second lateral magnetic members 11111B are disposed at the two sides of the bottom plate 1112, the two second lateral magnetic plates 11112B are disposed at the two second lateral magnetic members 1111B, the first magnetic module 112A further has a first magnetic member 1121A and a first magnetic plate 1122A, the first magnetic member 1121A is disposed on the bottom plate 1112, the first magnetic plate 1122A is disposed on the first magnetic member 1121A, the second magnetic module 112B further has a second magnetic member 1121B and a second magnetic plate 1122B, the second magnetic member 1121B is disposed on the bottom plate 1112, and the second magnetic plate 1122B is disposed on the second magnetic member 1121B.

The embodiment does not limit the structural combination of the above-mentioned single technical feature or multiple technical features. For example, the combination of the elastic member 13 of the first embodiment with the notch 1113 of the magnetic carrier 111, the combination of the elastic member 13 and the damper 16 of the second embodiment, the first extension part 123 and/or the second extension part 124 of the third embodiment, the combination of frame member 122 and supporting frame 125 in the fourth embodiment, the combination of the elastic member 13 of the sixth embodiment with the accommodating notches 1115 of the magnetic carrier 111, or the outer side of the connecting bracket 132 of the elastic member 13 of the seventh embodiment extending outward.

Figure 19:
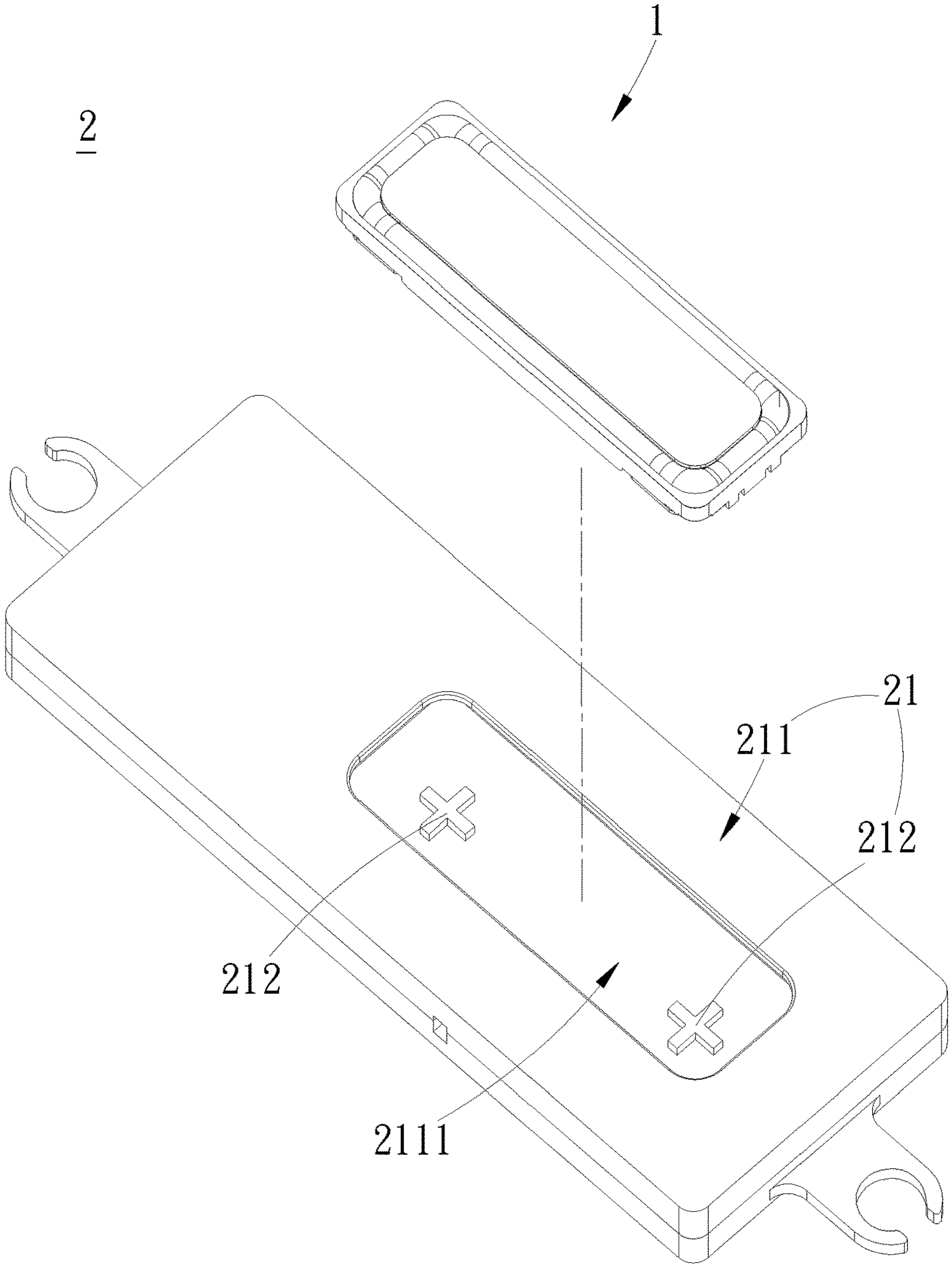
FIG. 19 illustrates an exploded view of a ninth embodiment of the speaker structure of the present invention.
Figure 20:
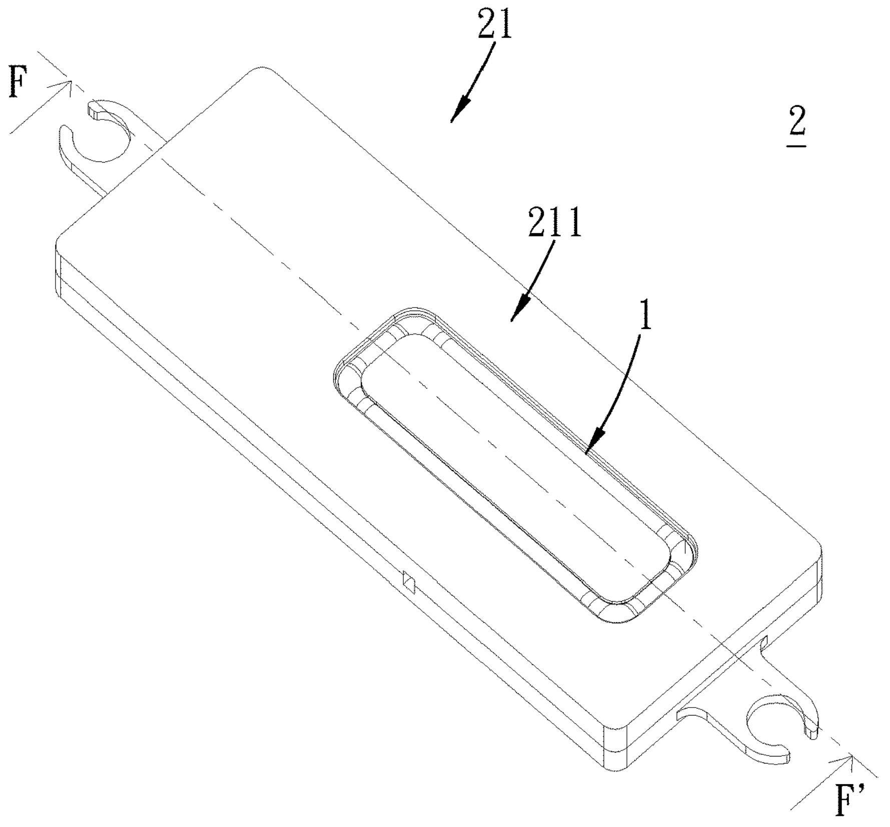
FIG. 20 illustrates an assembled view of the ninth embodiment of the speaker structure of the present invention and FIG. 21 illustrates a sectional view of a line F-F' in FIG. 20.
Figure 21:
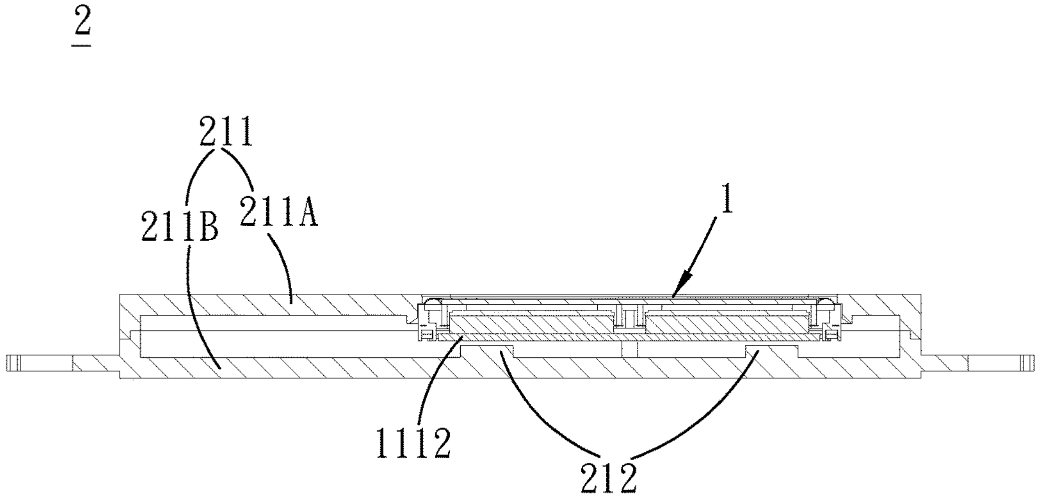

Please refer to FIG. 19 to FIG. 21, which illustrate an exploded view of a ninth embodiment of the speaker structure of the present invention, an assembled view of the ninth embodiment of the speaker structure of the present invention, and a sectional view of a line F-F' in FIG. 20. As shown in figures, the ninth embodiment provides a speaker device 2, which has a case 21, which has a shell 211) and two limiting parts (212, wherein the shell 211 has an accommodation slot 2111, and the limiting parts 212 are disposed at a bottom portion of the accommodation slot 2111. The speaker structure 1 is assembled in the accommodation slot 2111, and the bottom plate 1112 of the magnetic carrier 111 and the limiting parts 212 are corresponded to each other. The shell 211 has an upper shell 211A and a lower shell 211B. The speaker structure 1 is firstly disposed on the corresponding limiting parts 212 of the lower shell 211B, and simultaneously corresponds to a notch position of the accommodating slot 2111 of the upper shell 211A. After the upper shell 211A and the lower shell 211B are assembled, the speaker structure 1 is thus fixed in the accommodation slot 2111 of the upper case 211A and the lower case 211B. The speaker structure 1 described above includes the structures of the first to eighth embodiments.

Accordingly, when the speaker structure 1 is working to let the magnetic element 11 of the speaker structure 1 vibrate and make sound relative to the voice coil 15, the bottom plate 1112 of the magnetic carrier 111 in the magnetic element 11 will move up and down due to the vertical vibrations, and the space for the down vibration displacement is limited by the limiting parts 212, so that the vibrations of the magnetic element 11 are limited within a certain range. The user can adjust the vertical height of the limiting part 212 as required, so as to adjust the vertical vibration range of the magnetic element 11. In addition, the user can also change the structural shape of the limiting element 212 according to requirements, and is not limited to a cross, a straight line, a circle, etc.

In summary, the present invention provides a speaker structure and a speaker device. The speaker structure of the first embodiment has a magnetic carrier plate and two magnetic modules. The two magnetic modules are arranged on the magnetic carrier, and the two voice coils correspond to the two magnetic modules, so that the vibration sound structure increases the variability of the sound. Then the supporting elastic member and the two auxiliary elastic members are respectively connected between the outer frame and the two voice coils, so as to stabilize the vibration of the two voice coils. The speaker structure of the second embodiment uses the first and second extensions of the outer frame to limit the range in which the magnetic carrier can vibrate upward when the magnetic carrier vibrates upward. The speaker device assembles the speaker structure of the first embodiment or the second embodiment through the case, and the case can limit the downward vibration range of the magnetic carrier of the speaker structure.

Although the present disclosure is disclosed in the fore going embodiments, it is not intended to limit the present disclosure. Changes and modifications made without departing from the spirit and scope of the present disclosure belong to the scope of the claims of the present disclosure. The scope of protection of the present disclosure should be construed based on the following claims.

What is claimed is:

1. A speaker structure, comprising:

a magnetic element, having a magnetic carrier and a magnetic module, the magnetic carrier having two first lateral walls, two second lateral walls, and a bottom plate, the two first lateral walls and the two second lateral walls being disposed at two sides of the bottom plate, the magnetic module comprising a first magnetic module and a second magnetic module, the first magnetic module and the second magnetic module being disposed on the bottom plate, the first magnetic module being disposed between the two first lateral walls, the second magnetic module being disposed between the two second lateral walls;

an outer frame, comprising a frame member and a supporting rib, the outer frame disposed at a peripheral side of the magnetic element; the two ends of the supporting rib respectively connected and fixed to two internal walls of the frame member, the supporting rib being disposed between the first magnetic module and the second magnetic module;

two elastic members, each connected with the magnetic carrier and the outer frame, the elastic member being respectively disposed at two ends of the magnetic carrier, the magnetic element being connected into the outer frame in a suspended manner through the two elastic members;

a vibration member, disposed on the outer frame and located at the magnetic element and the two elastic members;

a voice coil, comprising a first voice coil and a second voice coil, the first voice coil and the second voice coil being arranged underneath the vibration member, the first voice coil located among the first magnetic module and the two first lateral walls of the magnetic carrier, the second voice coil located among the second magnetic module and the two second lateral walls of the magnetic carrier, a supporting elastic member, fixed to the supporting rib, the two ends of the supporting elastic member being respectively connected to one end of the first voice coil and one end of the second voice coil; and two auxiliary elastic members, respectively connected between the other end of the first voice coil and the outer frame and between the other end of the second voice coil and the outer frame.

2. The speaker structure according to claim 1, wherein the auxiliary elastic member has a fixing portion and a connecting portion, two sides of the fixing portion being elongated to connect with two sides of the connecting portion, the fixing portion being disposed in the outer frame, and the connecting portion being disposed at a bottom portion of the voice coil.

3. The speaker structure according to claim 1, wherein each of the auxiliary elastic members comprises a fixing portion and a connecting portion, wherein two sides of the fixing portion are elongated to connect with two sides of the connecting portion, the fixing portion is disposed in the outer frame, and the connecting portion is disposed at a bottom portion of the voice coil.

4. The speaker structure according to claim 1, wherein the supporting elastic member has two fixing sections, a first connecting section and a second connecting section, the two fixing sections being firmly disposed at the two ends of the supporting rib, one side of each of the two fixing sections being elongated to connect with the first connecting section, the first connecting section being connected with the one end of the first voice coil, another side of each of the two fixing sections being elongated to connect with the second connecting section, the second connecting section being connected with the one end of the second voice coil.

5. The speaker structure according to claim 1, wherein each of the two first lateral walls has a first lateral magnetic member and a first lateral magnetic plate, the two first lateral magnetic members being disposed at the two sides of the bottom plate, the two first lateral magnetic plates being disposed at the two first lateral magnetic members, each of the two second lateral walls having a second lateral magnetic member and a second lateral magnetic plate, the two second lateral magnetic members being disposed at the two sides of the bottom plate, the two second lateral magnetic plates being disposed at the two second lateral magnetic members, the first magnetic module further having a first magnetic member and a first magnetic plate, the first magnetic member being disposed on the bottom plate, the first magnetic plate being disposed on the first magnetic member, the second magnetic module further having a second magnetic member and a second magnetic plate, the second magnetic member being disposed on the bottom plate, the second magnetic plate being disposed on the second magnetic member.

6. The speaker structure according to claim 1, wherein each of the elastic members comprises a fixing bracket and two connecting brackets, the fixing bracket being disposed at the outer frame, the two connecting brackets being respectively elongated from two sides of the fixing bracket, and fixed at two bottom portions of two ends of the two lateral walls and the two sides of the magnetic carrier.

7. The speaker structure according to claim 6, wherein an external side of the two connecting brackets of each of the two elastic members is elongated outwardly to be beneath the outer frame, a vertical vibration path of the elastic member and a vertical vibration path of the connecting bracket being limited by the outer frame.

8. The speaker structure according to claim 6, wherein the bottom plate has four notches, which are respectively disposed at four corners of the bottom plate, the four ends of the two lateral walls being respectively elongated to four positions where are above the four notches, the two connecting brackets of the two elastic members being respectively and firmly disposed at the two bottom portions of the two ends of the two lateral walls.

9. The speaker structure according to claim 6, wherein the bottom plate has four accommodation notches, which are respectively disposed at four corners of the bottom plate, the four ends of the two lateral walls being elongated to four positions where are above the four accommodation notches, the two connecting brackets of the two elastic members being embedded into the four accommodation notches and disposed at the two bottom portions of the two ends of the two lateral walls.

10. The speaker structure according to claim 6, wherein each of the two elastic members further has two connecting arms, one end of the connecting arm being connected with the fixing bracket, and another end of the connecting arm being connected with the connecting bracket.

11. The speaker structure according to claim 10, the connecting arm is a curved structure, and a side, adjacent to the bottom plate, of the connecting bracket has an avoidance gap.

12. The speaker structure according to claim 6, wherein the outer frame has two fixing portions, which are respectively disposed at a bottom portion of the outer frame with the two elastic members, the fixing portion having a fixing slot, the fixing bracket of the elastic member being firmly disposed in the fixing slot.

13. The speaker structure according to claim 12 further comprising a damper, which is disposed between a bottom portion of the fixing slot of the outer frame and the fixing bracket of the elastic member.

14. The speaker structure according to claim 1, wherein the outer frame has a frame member and a second extension portion, the second extension portion extending inwardly from the frame member adjacent to the inner sides of the two first lateral walls and the two second lateral walls of the magnetic carrier, the second extension portion being above the two first lateral walls and the two second lateral walls.

15. The speaker structure according to claim 1, wherein the outer frame has a frame member and a first extension portion, the first extension portion extending inwardly from the inner sides of the frame member adjacent to the two first lateral walls and the two second lateral walls at an opening end of the magnetic carrier, the first extension portion being above the bottom plate of the magnetic carrier.

16. The speaker structure according to claim 1, wherein the outer frame has a frame member and a supporting frame, the supporting frame being in the frame member, in order to assist in supporting the structure of the frame member.

17. A speaker device having the speaker structure according to claim 1, comprising:

a case, having a shell and two limiting parts, the shell having an accommodation slot, the limiting parts being disposed at a bottom portion of the accommodation slot, the speaker structure being assembled in the accommodation slot, and the bottom plate of the magnetic carrier and the limiting parts being corresponded to each other.

18. A speaker structure, comprising:

a magnetic element, having a magnetic carrier and a magnetic module, the magnetic carrier having two lateral walls and one bottom plate, the two lateral walls being disposed at two sides of the bottom plate, the magnetic module being disposed on the bottom plate;

an outer frame, comprising a frame member, a first extension portion and a second extension portion, the outer frame disposed at a peripheral side of the magnetic element, the second extension portion extending inwardly from the frame member adjacent to inner sides of the two lateral walls of the magnetic carrier, the second extension portion being above the two lateral walls, the first extension portion extending inwardly from an inner side of the frame member adjacent to the two lateral walls at an opening end of the magnetic carrier, the first extension portion being above the bottom plate of the magnetic carrier;

two elastic members, each connected with the magnetic carrier and the outer frame, the elastic member being respectively disposed at two ends of the magnetic carrier, the magnetic element being connected into the outer frame in a suspended manner through the two elastic members;

a vibration member, disposed on the outer frame and located at the magnetic element and the two elastic members; and a voice coil, disposed underneath the vibration member and located among the magnetic module and the two lateral walls of the magnetic carrier.

19. The speaker structure according to claim 18, wherein each of the elastic members comprises a fixing bracket and two connecting brackets, wherein the fixing bracket is disposed at the outer frame, and the two connecting brackets are respectively elongated from two sides of the fixing bracket, and fixed at two bottom portions of two ends of the two lateral walls and the two sides of the magnetic carrier.

20. The speaker structure according to claim 19, wherein an external side of the two connecting brackets of each of the two elastic members is elongated outwardly to be beneath the outer frame, a vertical vibration path of the elastic member and a vertical vibration path of the connecting bracket being limited by the outer frame.

21. The speaker structure according to claim 19, wherein the bottom plate has four notches, which are respectively disposed at four corners of the bottom plate, the four ends of the two lateral walls being respectively elongated to four positions where are above the four notches, the two connecting brackets of the two elastic members being respectively and firmly disposed at the two bottom portions of the two ends of the two lateral walls.

22. The speaker structure according to claim 19, wherein the bottom plate has four accommodation notches, which are respectively disposed at four corners of the bottom plate, the four ends of the two lateral walls being elongated to four positions where are above the four accommodation notches, the two connecting brackets of the two elastic members being embedded into the four accommodation notches and disposed at the two bottom portions of the two ends of the two lateral walls.

23. The speaker structure according to claim 19, wherein each of the two elastic members further has two connecting arms, one end of the connecting arm being connected with the fixing bracket, and another end of the connecting arm being connected with the connecting bracket.

24. The speaker structure according to claim 23, the connecting arm is a curved structure, and a side, adjacent to the bottom plate, of the connecting bracket has an avoidance gap.

25. The speaker structure according to claim 19, wherein the outer frame has two fixing portions, which are respectively disposed at a bottom portion of the outer frame with the two elastic members, the fixing portion having a fixing slot, the fixing bracket of the elastic member being firmly disposed in the fixing slot.

26. The speaker structure according to claim 25 further comprising a damper, which is disposed between a bottom portion of the fixing slot of the outer frame and the fixing bracket of the elastic member.

27. The speaker structure according to claim 18, wherein the outer frame has a frame member and a supporting frame, the supporting frame being in the frame member, in order to assist in supporting the structure of the frame member.

28. The speaker structure according to claim 18 further comprising two auxiliary elastic members, the two auxiliary elastic members being connected with the voice coil and the outer frame, and corresponding to two ends of the voice coil, wherein the two ends are not adjacent to the two lateral walls of the magnetic carrier.

29. The speaker structure according to claim 28, wherein the auxiliary elastic member has a fixing portion and a connecting portion, two sides of the fixing portion being elongated to connect with two sides of the connecting portion, the fixing portion being disposed in the outer frame, and the connecting portion being disposed at a bottom portion of the voice coil.

30. The speaker structure according to claim 18, wherein each of the two lateral walls has a lateral magnetic member and a lateral magnetic plate, the lateral magnetic member being disposed at the one side of the bottom plate, the lateral magnetic plate being disposed at the lateral magnetic member, the magnetic module further having a magnetic body and a magnetic plate, the magnetic body being disposed on the bottom plate, the magnetic plate being disposed on the magnetic body.

31. The speaker structure according to claim 18, wherein the two lateral walls of the the magnetic carrier comprises two first lateral walls and two second lateral walls; the magnetic module further has a first magnetic module and a second magnetic module, the first magnetic module and the second magnetic module being disposed on the bottom plate of the magnetic carrier in order, the two first lateral walls and the two second lateral wall being on two sides of the bottom plate, the two first lateral walls being disposed at the two sides of the first magnetic module, and the two second lateral walls being disposed at the two sides of the second magnetic module.

32. The speaker structure according to claim 31, wherein the voice coil has a first voice coil and a second voice coil, which are disposed beneath the vibration member, the first voice coil being between the first magnetic module and the two first lateral walls of the magnetic carrier, and the second voice coil being between the second magnetic module and the two second lateral walls of the magnetic carrier.

33. The speaker structure according to claim 32, wherein the outer frame further has a frame member and a supporting rib, two ends of the supporting rib being connected with two inner walls of the frame member respectively, the supporting rib being disposed between the first voice coil and the second voice coil.

34. The speaker structure according to claim 33, further comprising a supporting elastic member and two auxiliary elastic members, the supporting elastic member being firmly disposed at the supporting rib, two sides of the supporting elastic member being connected with one end of the first voice coil and one end of the second voice coil, one end of one of the auxiliary elastic members being connected with the other end of the first voice coil, wherein the other end of the first voice coil is neighbor to the outer frame, one end of another of the auxiliary elastic members being connected with the other end of the second voice coil, wherein the other end of the second voice coil is adjacent to the outer frame.

35. The speaker structure according to claim 34, wherein the supporting elastic member has two fixing sections, a first connecting section and a second connecting section, the two fixing sections being firmly disposed at the two ends of the supporting rib, one side of each of the two fixing sections being elongated to connect with the first connecting section, the first connecting section being connected with the one end of the first voice coil, another side of each of the two fixing sections being elongated to connect with the second connecting section, the second connecting section being connected with the one end of the second voice coil.

36. The speaker structure according to claim 31, wherein each of the two first lateral walls has a first lateral magnetic member and a first lateral magnetic plate, the two first lateral magnetic members being disposed at the two sides of the bottom plate, the two first lateral magnetic plates being disposed at the two first lateral magnetic members, each of the two second lateral walls having a second lateral magnetic member and a second lateral magnetic plate, the two second lateral magnetic members being disposed at the two sides of the bottom plate, the two second lateral magnetic plates being disposed at the two second lateral magnetic members, the first magnetic module further having a first magnetic member and a first magnetic plate, the first magnetic member being disposed on the bottom plate, the first magnetic plate being disposed on the first magnetic member, the second magnetic module further having a second magnetic member and a second magnetic plate, the second magnetic member being disposed on the bottom plate, the second magnetic plate being disposed on the second magnetic member.

* * * * *